United States Patent [19]
Ibaraki et al.

[11] Patent Number: 6,098,733
[45] Date of Patent: Aug. 8, 2000

[54] HYBRID DRIVE SYSTEM FOR MOTOR VEHICLE

[75] Inventors: Ryuji Ibaraki, Toyota; Yutaka Taga, Aichi-ken; Atsushi Tabata, Okazaki, all of Japan

[73] Assignee: Toyota Jidosha Kabushiki Kaisha, Toyota, Japan

[21] Appl. No.: 08/728,378

[22] Filed: Oct. 9, 1996

[30] Foreign Application Priority Data

Oct. 13, 1995 [JP] Japan ................................. 7-265412

[51] Int. Cl.⁷ ........................................... B60K 6/04
[52] U.S. Cl. ..................... 180/65.2; 180/65.8; 318/376; 701/55
[58] Field of Search ................. 180/65.2, 65.1, 180/65.3, 65.4, 65.8; 318/8, 376; 701/22, 51, 55

[56] References Cited

U.S. PATENT DOCUMENTS

| | | | |
|---|---|---|---|
| 4,335,429 | 6/1982 | Kawakatsu | 180/65.2 X |
| 4,470,476 | 9/1984 | Hunt | 180/65.2 |
| 5,343,970 | 9/1994 | Severinsky | 180/65.2 |
| 5,346,031 | 9/1994 | Gardner | 180/65.2 X |
| 5,558,175 | 9/1996 | Sherman | 180/65.2 |
| 5,656,921 | 8/1997 | Farrall | 180/65.2 X |
| 5,697,466 | 12/1997 | Moroto et al. | 180/65.2 |

FOREIGN PATENT DOCUMENTS

| | | |
|---|---|---|
| 0 552 140 | 7/1993 | European Pat. Off. . |
| 5-50865 | 3/1993 | Japan . |
| 6-38304 | 2/1994 | Japan . |

OTHER PUBLICATIONS

Patent Abstracts of Japan, vol. 95, No. 003, JP–A–07 067208, Mar. 10, 1995.

*Primary Examiner*—Michael Mar
*Attorney, Agent, or Firm*—Oblon, Spivak, McClelland, Maier & Neustadt, P.C.

[57] ABSTRACT

A hybrid vehicle drive system including an engine, an electric motor operated by an electric energy stored in a storage device charged by operation of the engine, and a controller for selecting a low-load drive mode for driving the vehicle by the electric motor when the vehicle running condition is in a predetermined low-load range, and a high-load drive mode for driving the vehicle by the engine when the running condition is in a predetermined high-load range in which a load acting on the hybrid drive device is higher than that in the low-load range, and wherein the controller includes an emergency drive control device operated in the event of a failure of the first and second drive power sources, for operating the other, normal drive power source to drive the motor vehicle, and a range changing device for changing one of the low-load and high-load ranges which corresponds to the normal drive power source when the normal drive power source is operated by the emergency drive control device.

6 Claims, 9 Drawing Sheets

FIG. 11

```
SPECIAL CONTROL ROUTINE
         │
         ▼
  CALCULATING
  REQUIRED        R4-1
  POWER PL
         │
         ▼
      R4-2
    ╱ PL ≦ G ╲ ──NO──► INDICATION OF DRIVE   R4-4
    ╲   ?   ╱          SYSTEM FAILURE
      YES                    │
       │                     ▼
       ▼ R4-3                  R4-5
  OPERATING ELECTRIC    OPERATING ELECTRIC
  MOTOR TO PRODUCE      MOTOR TO PRODUCE
  THE CALCULATED        POWER CORRESPONDING
  REQUIRED POWER PL     TO THRESHOLD G
       │                     │
       ◄─────────────────────┘
       ▼
  SPECIAL SHIFT
  CONTROL OF       R4-6
  TRANSMISSION
       │
       ▼
     RETURN
```

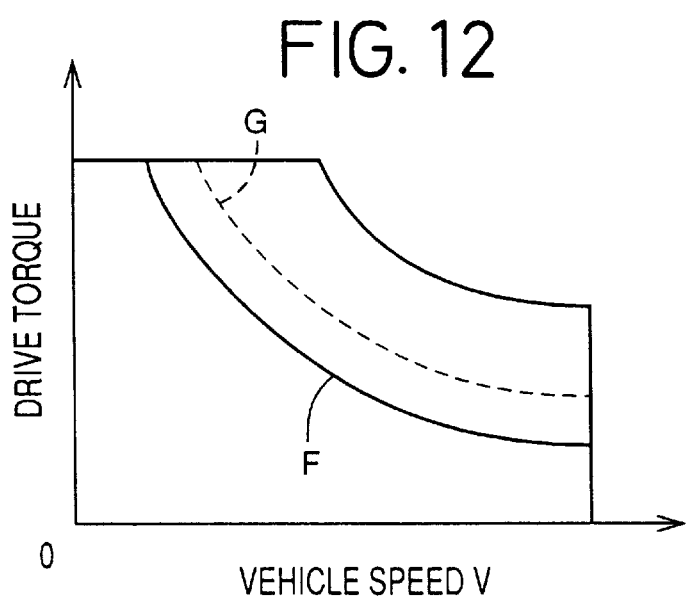

FIG. 12

HYBRID DRIVE SYSTEM FOR MOTOR VEHICLE

BACKGROUND OF THE INVENTION

1. Field of the Invention

The present invention relates in general to a so-called hybrid drive system for driving a motor vehicle, which drive system includes an engine and an electric motor. More particularly, the invention is concerned with a technique for permitting the motor vehicle to run to a desired destination even in the event of a failure of one of the engine and the electric motor where the engine and the electric motor are disposed in parallel connection with vehicle drive wheels, or a failure of one of the engine and an electric generator where the engine and the electric motor are disposed in series connection with the drive wheels.

2. Discussion of the Related Art

JP-A-5-50865 discloses an example of a hybrid drive system of so-called "parallel type", which includes (a) an engine operated by combustion of a fuel, (b) an electric energy storage device which is charged with an electric energy by rotation of the engine, and (c) an electric motor operated by the electric energy stored in the electric energy storage device, and wherein the engine and the electric motor are selectively used to drive the vehicle, depending upon the running condition of the vehicle. This type of hybrid drive system has a low-load drive mode in which only the electric motor is used to drive the vehicle, and a high-load drive mode in which the engine is used to drive the vehicle. The low-load and high-load drive modes are selectively established depending upon the running condition of the vehicle. The low-load drive mode is selected when the load acting on the hybrid drive system is relatively low (namely, when the currently required power or output for driving the vehicle is relatively small), and the high-load drive mode is selected when the load acting on the drive system is relatively high (namely, when the currently required power or output is relatively large). Also known is a hybrid drive system of so-called "series type", which includes (a) an engine operated by combustion of a fuel, (b) an electric generator driven by the engine for generating an electric energy energy, (c) an electric energy storage device for storing the electric energy generated by the electric generator, and (d) an electric motor operated by the electric energy generated by the electric generator or stored in the storage device, and wherein the electric motor is used as a drive power source for driving the vehicle. There is also known a hybrid drive system of so-called "parallel series type" which is a combination of the parallel type hybrid drive system and the series type hybrid drive system, wherein the engine of the series type hybrid drive system is used as another drive power source in addition to the electric motor.

In the event of a failure of the engine or electric motor in the parallel type hybrid drive system, the motor vehicle cannot be driven at all or cannot be driven a distance sufficient to reach the desired destination. If the engine becomes defective, the vehicle should be driven by the electric motor. Since the torque produced by the electric motor is relatively small, the vehicle cannot be driven by the electric motor with a sufficient torque where the required power is relatively large, for instance, where the vehicle is required to climb an uphill. It is also noted that the electric energy is stored in the storage device by the engine as well as by utilizing regenerative braking of the electric motor, the failure of the engine results in an insufficient amount of the electric energy stored in the storage device, making it impossible to operate the electric motor for driving the vehicle over a distance sufficient to reach the desired destination. If the electric motor becomes defective, the vehicle should be driven by the engine. Since the drive system is designed to select the engine drive mode only when the vehicle is in a high-load condition, the vehicle cannot be driven by the engine in the engine drive mode when the vehicle is in a low-load condition, for example, immediately after the vehicle has been started or immediately before the vehicle is stopped. Where the hybrid drive system of the parallel type is equipped with a transmission which is shifted to change its speed ratio depending upon the running condition of the vehicle, a failure of one of the engine and the electric motor causes deteriorated running performance of the vehicle. That is, the power transmitted from the normal drive source (normally functioning engine or electric motor) to the transmission does not match the selected speed ratio if the transmission is shifted to change its speed ratio depending upon the amount of operation of the accelerator pedal or other running condition of the vehicle in the same manner as in the normal state of the drive system. In this case, the vehicle may not be driven at all, or the running distance is considerably limited.

In the event of a failure of the electric motor as the drive power source in the series type hybrid drive system, it is certainly impossible to drive the vehicle. However, a failure of the engine or electric generator also causes a problem. Namely, the failure of the engine makes it impossible to operate the electric generator to generate the electric energy, and the electric energy that can be used by the electric motor to drive the vehicle is limited to that stored in the electric energy storage device. If the vehicle is run under a relatively high load, the running distance is limited particularly since the energy efficiency is relatively low in the high-load running condition. If the ratio of the electric energy necessary to operate the electric motor to the electric energy stored in the storage device is controlled, the failure of the electric generator to generate the electric energy results in shortage of the electric energy to be used by the electric motor, leading to a possibility of running failure of the vehicle due to an insufficient output of the electric motor.

SUMMARY OF THE INVENTION

It is therefore an object of the present invention to provide a hybrid drive system for a motor vehicle, which permits the vehicle to run to a desired destination even in the event of a failure of the engine or the electric motor of the parallel type drive system or a failure of the engine or the electric generator of the series type drive system.

The above object may be achieved according to a first aspect of the present invention, which provides a hybrid drive system (10) for a motor vehicle, comprising: (a) an engine operated as a first drive power source by combustion of a fuel; (b) an electric energy storage device which is charged with an electric energy by operation of the engine; (c) an electric motor operated as a second drive power source by the electric energy stored in the electric energy storage device; and (d) a controller for selecting a low-load drive mode in which only the electric motor is operated to drive the vehicle is selected, when a running condition of the vehicle is in a predetermined low-load range, and a high-load drive mode in which at least the engine is operated to drive the vehicle, when the running condition is in a predetermined high-load range in which a load acting on the hybrid drive device is higher than that in the predetermined low-load range, and wherein the controller includes emergency drive control means operated in the event of a failure of one of the engine and the electric motor as the first and second drive power sources, for operating the other of the first and second drive power sources to drive the motor vehicle, and range changing means for changing one of the predetermined low-load and high-load ranges which corresponds to the other of the first and second drive power sources, when the other of the first and second drive power sources is operated by the emergency drive control means.

The hybrid drive system according to the first aspect of the invention is of the parallel type adapted such that in the event of a failure of one of the engine and the electric motor, the emergency drive control means activates the other of the engine and the electric motor to drive the vehicle, and the range changing means changes the corresponding low-load or high-load range in which the normally functioning engine or electric motor is operated in the low-load or high-load drive mode. Accordingly, the present hybrid drive system permits the vehicle to be run even in a condition in which the normally functioning motor or electric motor could not be operated in the prior art hybrid drive system. The present hybrid drive system is therefore effective to increase the distance of running of the vehicle by the normally functioning drive power source, making it possible to run the vehicle to the desired destination even in the event of a failure of the engine or electric motor.

According to a first preferred form of the hybrid drive system described above, the range changing means comprises lower limit changing means for enlarging the predetermined high-load range by reducing a lower limit of the high-load range, when the engine is operated as the normal drive power source by the emergency drive control means. In this case, the vehicle can be driven by the engine under a lower load than in the normal state of the drive system, and can be smoothly started and stopped. According to a second preferred form of the hybrid drive system, the range changing means comprises upper limit changing means for enlarging the predetermined low-load range by increasing an upper limit of the low-load range, when the electric motor is operated as the normal drive power source by the emergency drive control means. In this case, the vehicle can be driven by the electric motor under a higher load than in the normal state of the drive system, and can be run on an uphill road. According to a third preferred form of the present hybrid drive system, the range changing means may comprise upper limit changing means for narrowing the predetermined low-load range by reducing an upper limit of the low-load range, when the electric motor is operated as the other drive power source by the emergency drive control means. In this case, the amount of the electric energy consumed by the electric motor is reduced, and the distance of running of the vehicle by the energy stored in the storage device can be accordingly increased.

The running condition of the motor vehicle may be represented by an amount of power currently required by an operator of the vehicle to drive the vehicle. For instance, the amount of power currently required by the operator is represented by a currently required output of the drive system (which may be represented by a currently detected amount of operation of an accelerator pedal by the operator) and a currently detected speed of the vehicle. In this instance, the low-load and high-load ranges may be respective low-load and high-load areas which are defined by predetermined relationships between the currently required output and the currently detected vehicle speed.

When the vehicle running condition is in the high-load range, the vehicle is driven by at least the engine in the high-load drive mode, which may consist of an engine drive mode in which only the engine is operated to drive the vehicle, or an engine•motor drive mode in which both of the engine and the electric motor are operated to drive the vehicle. The electric energy storage device is charged as needed by an electric generator, which may be the electric motor or a dynamo separate from the electric motor. The electric generator is driven by the engine or regenerative braking. When the vehicle running condition is in the low-load range, the vehicle is driven by only the electric motor in the low-load drive mode. In this low-load drive mode, the electric motor is operated by only the electric energy which has been stored in the electric energy storage device, or by not only the stored electric energy, but also the electric energy generated by the electric generator operated by the engine. The electric motor may be provided for each of two or more drive wheels of the vehicle, or may be used commonly for the two or more drive wheels. Where the engine and the electric motor are disposed in parallel connection with a transmission whose speed ratio is variable, the two or more drive wheels are desirably driven by the single electric motor.

As indicated above, the low-load drive mode or the high-load drive mode is selected depending upon whether the vehicle running condition falls in the predetermined low-load range or in the high-load range in which the load acting on the hybrid drive system is higher than in the low-load range. The vehicle running condition may be represented by an amount of power currently required to drive the vehicle, which may be represented by the drive torque and the running speed of the vehicle. The low-load and high-load ranges of the vehicle running condition (e.g., currently required power) are usually determined so as to reduce the amount of fuel consumption by the engine and the amount of electric energy consumption by the electric motor. The low-load and high-load ranges may be defined by upper and lower limits of the currently required output of the engine or electric motor. For instance, the range changing means may be the lower limit changing means or the upper limit changing means as described above. Where the hybrid drive system includes a transmission whose speed ratio is variable, the range changing means may be adapted to change the speed ratio of the transmission so that the low-load or high-load range is shifted to increase the drive torque and reduce the vehicle running speed, or to reduce the drive torque and increase the vehicle running speed. The capacity or nominal or maximum output of the electric motor is generally determined depending upon the amount of electric energy generated by regenerative braking by the electric motor, and the upper limit of the low-load range in which the electric motor is operated is considerably lower than the maximum output of the electric motor. This means that it is possible to operate the electric motor even when the upper limit of the low-load range is increased to enlarge the low-load range as described above with respect to the second preferred form of the invention.

The emergency drive control means of the hybrid drive system according to the present first aspect of this invention may be adapted to be operated only in the event of a failure of the electric motor, to drive the vehicle by the engine, or only in the vent of a failure of the engine, to drive the vehicle by the electric motor. Alternatively, the emergency drive control means may be adapted to operated in both of these cases.

Regarding the preferred forms of the present first aspect of the invention described above, the enlarged high-load range for operating the engine in the event of a failure of the electric motor, and the enlarged or narrowed low-load range for operating the electric motor in the event of a failure of the engine may be stored in a memory as a data map. Alternatively, a predetermined value may be added to or subtracted from the upper or lower limit of the normal high-load or low-load range, to enlarge or narrow the range. Further alternatively, the upper or lower limit of the normal range is multiplied by a predetermined value, to obtain the enlarged or narrowed range. The upper limit changing means according to the first preferred form is adapted to reduce the lower limit of the high-load range to thereby enlarge the range when the engine is operated to drive the vehicle in the event of a failure of the electric motor. In this case, the lower limit of the high-load range is reduced to permit the vehicle to run at a speed low enough for smooth starting and stopping of the vehicle. However, the lower limit of the high-load range may be zeroed. The upper limit changing means according to the second preferred form is adapted to increase the upper limit of the low-load range to thereby enlarge the range when the electric motor is operated to drive the vehicle in the event of a failure of the engine. In this case, the upper limit of the low-load range to meet a predetermined requirement or requirements, for instance, to permit the vehicle to run at a speed higher than a predetermined lower limit Y (km/h) under a given condition (e.g., during running on a road surface whose gradient is $X°$), or permit the vehicle to be accelerated at a rate higher than a lower limit Z (G) after the starting under a given condition. While the lower limit or upper limit changing means described above is adapted to change the upper or lower limit of the output of the engine or electric motor, the changing means may be adapted to change the upper or lower limit of the drive torque or running speed of the vehicle.

The object indicated above may also be achieved according to a second aspect of this invention, which provides a hybrid drive system for a motor vehicle, comprising: (a) an engine operated as a first drive power source by combustion of a fuel; (b) an electric energy storage device which is charged with an electric energy by operation of the engine; (c) an electric motor operated as a second drive power source by the electric energy stored in the electric energy storage device; (d) a transmission for transferring an output of one of the first and second drive power sources to a drive wheel of the vehicle, when one of the first and second drive power sources is selected depending upon a running condition of the vehicle; and (e) a controller for controlling the transmission to change a speed ratio thereof depending upon the running running condition, and wherein the controller comprises emergency drive control means operated in the event of a failure of one of the engine and the electric motor as the first and second drive power sources, for operating the other of the first and second drive power sources, and emergency shift control means for changing a predetermined relationship between the running condition of the vehicle and the speed ratio of the transmission, when the other of the first and second drive power sources is operated by the emergency drive control means.

The hybrid drive system according to the second aspect of the invention may be of either the parallel type or the series type, which is adapted such that in the event of a failure of one of the engine and the electric motor, the emergency drive control means activates the other of the engine and the electric motor to drive the vehicle, and the emergency shift control means changes the predetermined relationship between the vehicle running condition and the speed ratio of the transmission when the normal drive power source is operated by the emergency drive control means. The emergency shift control means permits the transmission to be suitably shifted so as to reduce the electric energy consumption by the electric motor in the event of a failure of the engine, or improve the drivability of the vehicle. The hybrid drive system according to this second aspect of this invention has substantially the same advantages as the hybrid drive system according to the first aspect of the invention.

The controller may be adapted to shift the transmission to one of a plurality of operating positions thereof on the basis of an amount of operation of an accelerator pedal and a running speed of the vehicle.

The object indicated above may also be achieved according to a third aspect of this invention, which provides a hybrid drive system for a motor vehicle, comprising: (a) an engine operated by combustion of a fuel; (b) an electric energy storage device which is charged with an electric energy by operation of the engine; (c) an electric motor (14) operated by the electric energy stored in the electric energy storage device; (d) a transmission whose speed ratio is variable; and (e) a controller for operating at least the electric motor to drive the vehicle, and wherein the controller comprises energy-saving shift control means operated in the event of a failure of the engine, for shifting the transmission to change the speed ratio so as to reduce an amount of consumption of the electric energy by the electric motor, depending upon at least one of a power transfer efficiency of the transmission and an energy conversion efficiency of the electric motor.

The hybrid drive system according to the third aspect of the invention may be of either the parallel type or the series type, wherein the energy-saving shift control means is operated in the event of a failure of the engine, for shifting the transmission to change the speed ratio so as to reduce the amount of consumption of the electric energy by the electric motor, whereby the electric energy consumption by the electric motor is reduced, and the distance of running of the vehicle by the electric energy stored in the storage device is accordingly increased, permitting the vehicle to be run to the desired destination.

The transmission provided in the hybrid drive system according to the second or third aspect of the invention described above may be either a transmission having a plurality of operating positions having different speed ratios, or a continuously variable transmission whose speed ratio is continuously variable. In the hybrid drive system according to the second aspect of the invention, the predetermined relationship between the vehicle running condition and the speed ratio of the transmission is changed by the emergency shift control means. This predetermined relationship, when used for shifting the transmission having two or more operating positions, may consist of shift pattern maps defined by the operation amount of the accelerator pedal and the running speed of the vehicle, for example. When the predetermined relationship is used for the continuously variable transmission, the relationship may be represented by predetermined equations formulated to determine the speed ratio on the basis of the accelerator pedal operation amount and the vehicle running speed. In the event of a failure of one of the engine and the electric motor, the emergency shift control means changes the shift pattern maps or equations so that the transmission is shifted to a position suitable for the output range of the normal drive power source. In the parallel type hybrid drive system, the vehicle may be driven in the low-load or high-load drive mode depending upon the running condition of the vehicle, for example, the operation amount of the accelerator pedal, as described above with respect to the first aspect of the invention. For instance, the vehicle is driven by the electric motor in the low-load drive mode when the accelerator pedal operation amount is smaller than a predetermined upper limit, and is driven by the engine in the high-load drive mode when the accelerator pedal operation amount is larger than a predetermined lower limit. In the event of a failure of the engine, the vehicle is driven by the electric motor such that the maximum output of the electric motor corresponds to the predetermined upper limit of the low-load range, which may be increased to enlarge the low-load range in the event of the engine failure as described above with respect to the second preferred form of the first aspect of the invention. In other words, the speed ratio of the transmission is selected within the output range of the electric motor whose upper limit may be changed by the upper limit changing means as described above. In the event of a failure of the electric motor, the vehicle is driven by the engine with the transmission being suitably shifted so as to meet the output range of the engine, whose lower limit may be reduced to enlarge the high-load range in the event of the motor failure as described above with respect to the first preferred form of the first aspect of the invention. The data map or equation for obtaining the currently required power for driving the vehicle may be formulated such that the maximum output of the electric motor corresponds to the 100% operation of the accelerator pedal in the event of a failure of the engine, or the minimum output of the engine corresponds to the 0% operation of the accelerator pedal in the event of a failure of the electric motor.

The emergency shift control means may be adapted to change the predetermined relationship so as to satisfy a predetermined requirement or requirements. For example, the shift patterns for shifting the transmission may be changed so that the transmission is placed in a relatively low-gear position in the event of a failure of the engine, for the purpose of increasing the drivability of the vehicle by the electric motor during running on an uphill road. Further, the shift patterns may be determined so as to permit the vehicle to run at a speed higher than a given lower limit Y (km/h) under a given condition (e.g., given gradient X° of the road surface), or so as to permit the vehicle to be started at an acceleration rate higher than a given lower limit Z (G) under a given condition. Alternatively, the shift patterns used in the event of the engine failure may be formulated so as to minimize the amount of consumption of the electric energy by the electric motor 14 as in the hybrid drive system according to the third aspect of the invention. In the event of a failure of the electric motor, the emergency shift control means may change the shift patterns so that the transmission is placed in a relatively low-gear position, for permitting the vehicle to be driven by the engine at a sufficiently low speed for smooth starting and stopping of the vehicle, or so as to improve the fuel consumption efficiency or exhaust gas efficiency of the engine. The predetermined relationship between the vehicle running condition and the speed ratio of the transmission used in the event of a failure of the engine or electric motor may be stored in a memory as a data map. In this case, the emergency shift control means simply retrieves the relationship from the memory in the event of a failure of the engine or electric motor. Alternatively, a predetermined value may be added to or subtracted from a shift boundary value (e.g., shift boundary value of the operation amount of the accelerator pedal) used in the normal state of the drive system, to obtain the relationship (shift patterns) used in the event of a failure of the engine or electric motor. Further alternatively, the normal shift boundary value may be multiplied by a predetermined value, to obtain the relationship used in the event of the engine or motor failure.

The energy-saving shift control means of the hybrid drive system according to the third aspect of the invention is operated in the event of a failure of the engine, for controlling the speed ratio of the transmission so as to reduce or preferably minimize the amount of electric energy consumption of the electric motor, depending upon the power transfer efficiency of the transmission and/or the energy conversion efficiency of the electric motor. Where the transmission is controlled depending upon the vehicle running condition as in the second aspect of the invention, the energy-saving shift control means may be adapted to shift the transmission according to shift patterns which are determined so as to reduce the electric energy consumption, by taking into account at least one of the power transfer efficiency of, the transmission and the energy conversion efficiency of the electric motor. The present third aspect of the invention may be practiced together with the first aspect and/or the second aspect of the invention described above. The hybrid drive system according to the third aspect of the invention may be of the parallel or series type. Where the third aspect of the invention is embodied as the series type hybrid drive system, the energy-saving shift control means is desirably adapted to control the transmission so as to reduce or minimize the electric energy consumption by the electric motor in the event of a failure of the electric generator as well as the engine.

The object indicated above may also be achieved according to a fourth aspect of this invention, which provides a hybrid drive system for a motor vehicle, comprising: (a) an engine operated by combustion of a fuel; (b) an electric energy storage device which is charged with an electric energy by operation of the engine; (c) an electric motor operated by the electric energy stored in the electric energy storage device; and (d) a controller for operating at least the electric motor to drive the vehicle when an amount of the electric energy stored in the electric energy storage device is not smaller than a predetermined lower limit, and wherein the controller comprises lower limit changing means for reducing the lower limit of the electric energy stored in the electric energy storage device, in the event of a failure of the engine.

The hybrid drive system according to the fourth aspect of the invention may be of either the parallel type or the series type, wherein the lower limit changing means is operated in the event of a failure of the engine, to reduce the lower limit of the electric energy stored in the storage device, above which the electric motor is operated. Accordingly, the amount of the electric energy which is stored in the storage device and which can be consumed by the electric motor is increased, leading to an increase in the distance of running of the vehicle by the electric motor, and permitting the vehicle to be run to the desired destination.

The lower limit changing means may be adapted to zero the lower limit of the electric energy, namely, to eliminate the lower limit above which the electric motor is operated. Normally, the electric motor is operated when the amount of the electric energy stored in the storage device is larger than the lower limit of about 70–80% of the full capacity of the storage device. This lower limit is determined in view of the energy conversion efficiency of the electric motor and the service life of the storage device. In the normal state of the hybrid drive system, therefore, the electric motor cannot be used when the currently stored electric energy is smaller than about 70% of the full capacity of the storage device. To permit the use of the electric motor under such condition in the event of a failure of the engine, the lower limit changing means reduces the lower limit down to a predetermined level, for example, a level smaller than about 70% of the full capacity of the storage device. This arrangement results in an increase in the distance of running of the vehicle by the electric motor in the event of the engine failure. The hybrid drive system according to the fourth aspect of the invention may be of the parallel or series type. Where the fourth aspect of the invention is embodied as the series type hybrid drive system, the lower limit changing means is desirably adapted to reduce the lower limit of the electric energy in the event of a failure of the electric generator as well as the engine.

The object indicated above may also be achieved according to a fifth aspect of this invention, which provides a hybrid drive system for a motor vehicle, comprising: (a) an engine operated by combustion of a fuel; (b) an electric generator operated by the engine to generate an electric energy; (c) an electric energy storage device for storing the electric energy generated by the electric generator; (d) an electric motor operated by the electric energy generated by the electric generator and/or the electric energy stored in the electric energy storage device, and wherein the electric motor functions as a drive power source for driving the motor vehicle; and (e) emergency motor drive control means operated in the event of a failure of the engine or the electric generator, for operating the electric motor to drive the motor vehicle such that a load acting on the electric motor is smaller than a predetermined upper limit, the emergency motor drive control. means permitting the electric motor to consume an entire amount of the electric energy stored in the electric energy storage device.

The hybrid drive system according to the fifth aspect of the invention is of the series type, wherein the emergency motor drive control means is operated in the event of a failure of the engine or electric generator, to operate the electric motor to drive the motor vehicle such that the load acting on the electric motor does not exceed the predetermined upper limit and such that the electric motor is permitted to consume the entire amount of the electric energy stored in the electric energy storage device. This arrangement is effective to reduce the electric energy consumption by the electric motor since the maximum output of the electric motor is limited to the upper limit. Accordingly, the vehicle can be driven a relatively long distance by the electric motor by the electric energy stored in the storage device, even in the event of a failure of the electric generator to generate the electric energy. Further, the entire amount of the electric energy stored in the storage device can be used by the electric motor, if necessary to drive the vehicle to the desired destination, in the event of a failure of the engine or electric generator, that is, even if the storage device cannot be charged due to the failure of the engine or generator.

In the normal state of the series type hybrid drive system according to the fifth aspect of this invention, the electric motor may be operated without a limitation in the load acting thereon, while the electric generator is operated by the engine to generate the electric energy. However, the hybrid drive system may be adapted such that the engine is held off when the load acting on the electric motor is lower than a predetermined upper limit, so that the electric motor is operated solely by the electric energy stored in the storage device, and such that the engine is operated when the load acting on the electric motor is higher than the predetermined upper limit, so that the electric motor is operated by the electric energy generated by the electric generator operated by the engine, while the surplus electric energy is stored in the storage device. Although the electric motor is usually used as the drive power source for driving the vehicle, the vehicle may be driven by only the engine, or by the engine and the electric motor, under some running condition of the vehicle. The present fifth aspect of the invention may be practiced together with the third or fourth aspect of the invention described above. Where the hybrid drive system according to the present fifth aspect of the invention includes a transmission, the hybrid drive system is desirably provided with the emergency shift control means as described above with respect to the second aspect of the invention, which is adapted to be operated when the load on the electric motor is limited in the event of a failure of the engine or electric generator.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which:

FIG. 11 is a flow chart showing in detail a special control routine in step R4 of the basic routine of FIG. 9, which is executed in the event of a failure of the engine or electric generator; and FIG. 12 is a graph for explaining a threshold value F used in the normal control routine of FIG. 10, and a threshold value G used in the special control routine of FIG. 11.

DETAILED DESCRIPTION OF THE PREFERRED EMBODIMENT

Figure 1:
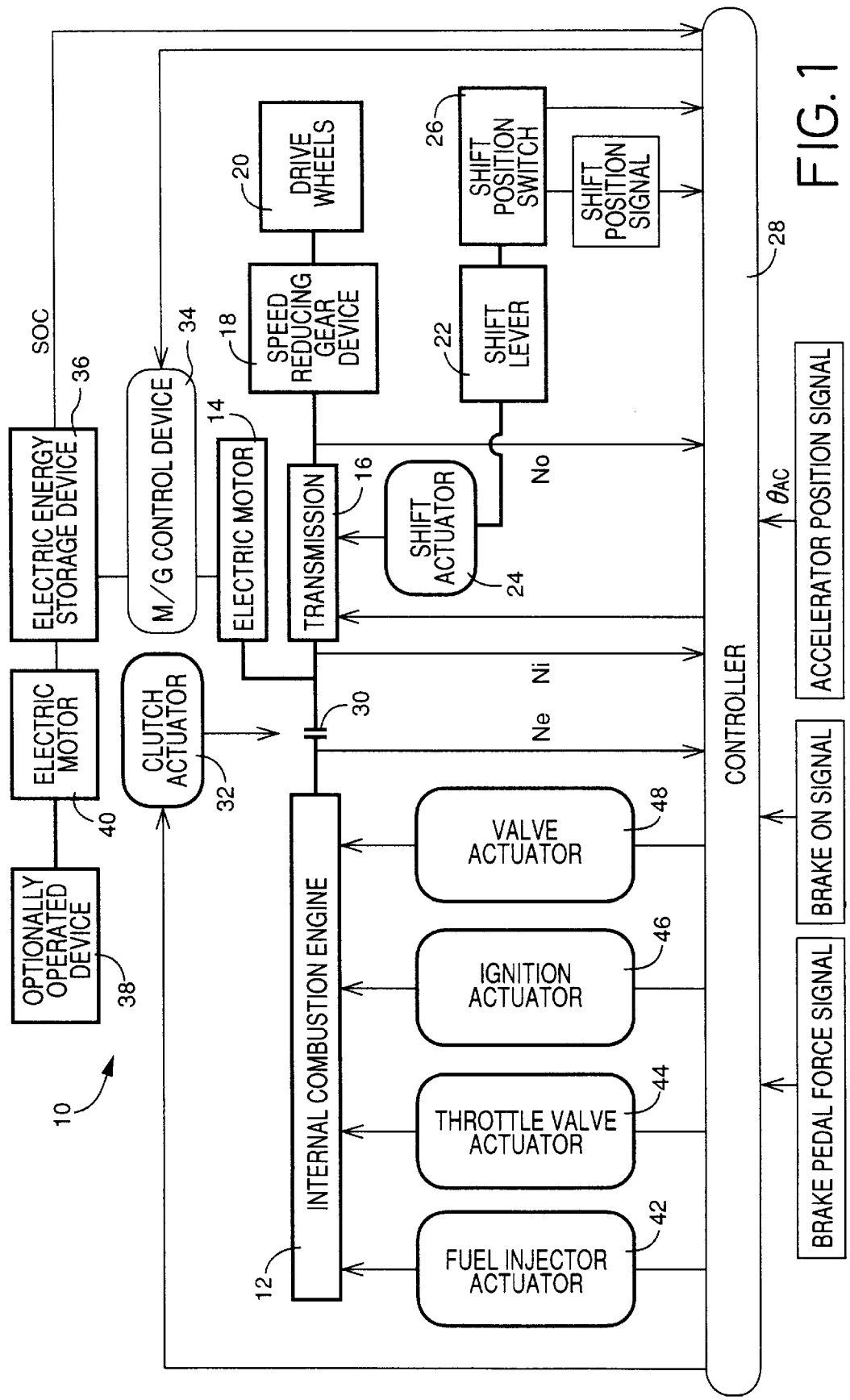
FIG. 1 is a block diagram illustrating a parallel type hybrid drive system for a motor vehicle, which is constructed according to one embodiment of this invention.

Referring first to the block diagram of FIG. 1, there is diagrammatically illustrated a parallel type hybrid drive system 10 for driving a motor vehicle. In FIG. 1, thick solid lines indicate mechanical connection of components, while thin solid lines indicate electrical connection of components. The hybrid drive system 10 includes two drive power sources, namely, an internal combustion engine 12 such as a gasoline engine operated by combustion of a fuel, and an electric motor 14 operated by an electric energy. The engine 12 and the electric motor 14 are disposed in parallel connection with a transmission 16. Power of the engine 12 and the power of the electric motor 14 are simultaneously or selectively transmitted to the transmission 16, and transferred to drive wheels 20 of the vehicle through a speed reducing gear device and a differential gear device. The transmission 16 includes a forward-reverse switching mechanism and a shift mechanism. The switching mechanism has three positions: forward position (FWD) for running the vehicle in the forward direction; reverse position (REV) for running the vehicle in the rearward direction; and neutral position (N). The shift mechanism has a plurality of forward-driving positions having respective different speed ratios, which are selectively established when the forward-reverse switching mechanism is placed in the forward position (FWD). The transmission 16 is shifted by a shift actuator 24 so that the transmission 16 is placed in one of the neutral and reverse positions and the forward-driving positions, depending upon the currently selected position of a shift lever 22. Described in detail, the currently selected position of the shift lever 22 is detected by a shift position switch 26. The shift actuator 24 is controlled by a controller 28, according to a SHIFT POSITION signal received from the shift position switch 26 indicative of the currently selected position of the shift lever 22. The engine 12 and the transmission 16 are connected to each other through a clutch 30, which is engaged and released by a clutch actuator 32 under the control of the controller 28. Normally, the clutch 30 is placed in its engaged position.

The electric motor 14 is connected to an electric energy storage device 36 such as a battery or condenser, through a motor/generator control device 34 (hereinafter referred to as "G/M control device 34"). The electric motor 14 is selectively placed in a DRIVE state, a CHARGING state, and a NON-LOAD state by the M/G control device 34 under the control of the controller 28. In the DRIVE state, the motor 14 is driven by an electric energy supplied from the electric energy storage device 36. In the CHARGING state, the motor 14 functions as an electric generator or dynamo, with regenerative braking (braking torque electrically generated by the motor 14 itself), for storing an electric energy in the electric energy storage device 36. In the NON-LOAD state, the output shaft of the motor 14 is permitted to rotate freely. The engine 12 is controlled by various actuators including an actuator 42 for controlling a fuel injector valve, an actuator 44 for controlling a throttle valve, an actuator 46 for controlling an ignitor, and an actuator 48 for controlling intake and discharge valves. Like the M/G control device 34, these actuators 42, 44, 46, 48, are controlled by the controller 28. The electric energy storage device 36 is electrically connected to an electric motor 40 used for driving an optionally operated device 38 such as a compressor for an air conditioner.

The controller 28 is principally constituted by a microcomputer incorporating a central processing unit (CPU), a random-access memory (RAM) and a read-only memory (ROM). The controller 28 performs data processing operations to execute various control routines such as those illustrated in the flow charts of FIGS. 2–5, according to control programs stored in the ROM. The controller 28 receives output signals of various detectors, which include the SHIFT POSITION signal received from the shift position switch 26. Since an operation of the shift lever 22 can be detected on the basis of the SHIFT POSITION signal of the shift position switch 26, this SHIFT POSITION signal permits determination as to whether the transmission 16 is placed in a position in which engine brake is applied to the vehicle. The output signals of the detectors received by the controller 28 further include: a signal indicative of a rotating speed Ne of the engine 12; a signal indicative of a rotating speed Ni of the input shaft of the transmission 16 (i.e., rotating speed of the drive shaft of the electric motor 14); a signal indicative of a rotating speed No of the output shaft of the transmission 16 (which can be used to determine a running speed V of the vehicle); a signal indicative of an amount of electric energy SOC stored in the electric energy storage device 22; an ACCELERATOR POSITION signal indicative of an amount of operation $\theta_{AC}$ of an accelerator pedal; a BRAKE ON signal indicative of an operation of a brake pedal by the vehicle operator; and a BRAKE PEDAL FORCE signal indicative of a depression force acting on the brake pedal. The electric energy amount SOC can be obtained from an electric current or charging efficiency of the electric motor 14 when the motor 14 is operated as the electric generator in the CHARGING state.

Figure 2:
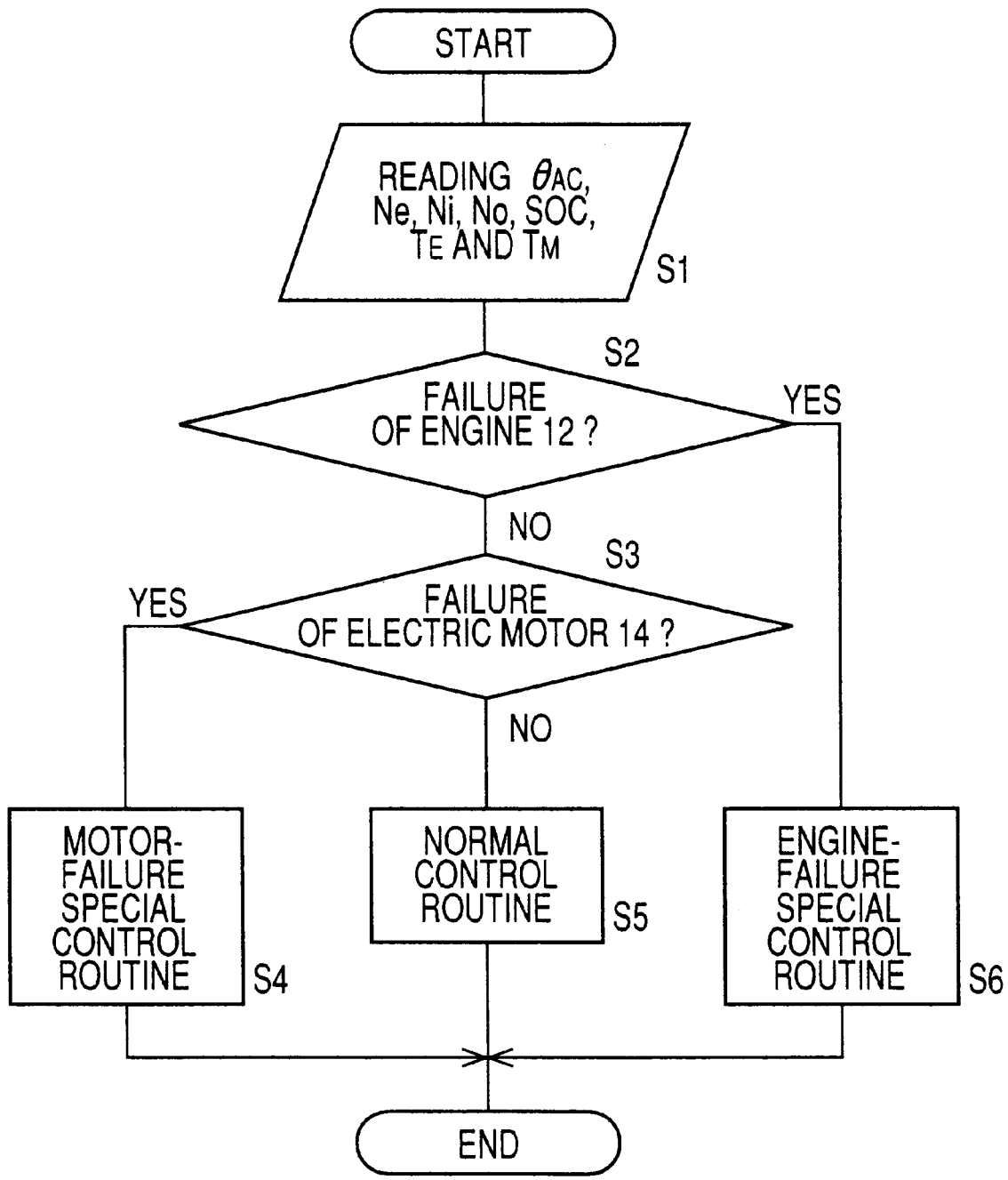
FIG. 2 is a flow chart for explaining a basic routine executed by the hybrid drive system of FIG. 1.

Referring next to the flow chart of FIG. 2, a basic control routine executed by the present hybrid drive system 10 will be described. The routine is initiated with step S1 to read the amount of operation $\theta_{AC}$ of the accelerator pedal, the engine speed Ne, the input shaft speed Ni and output shaft No of the transmission 16, the amount of electric energy SOC stored in the electric energy storage device 36, a torque $T_E$ of the engine 12 and a torque $T_M$ of the electric motor 14. The engine torque $T_E$ may be calculated on the basis of the opening angle of the throttle valve, or the amount of fuel injection into the engine 12, for example. The motor torque $T_M$ may be calculated on the basis of an electric current of the electric motor 14, for example. Then, the control flow goes to step S2 to determine whether the engine 12 fails to normally function. This determination is effected on the basis of a relationship between the engine torque $T_E$ (which is calculated from the opening angle of the throttle valve) and the actual rotating speed Ne of the engine 12, for example. If a negative decision (NO) is obtained in step S2, the control flow goes to step S3 to determine whether the electric motor 14 fails to normally function. This determination is effected on the basis of a relationship between the motor torque $T_M$ (which is calculated from the electric current of the motor 14) and the actual rotating speed of the electric motor 14 (i.e., input shaft speed Ni of the transmission 16), for example. If a negative decision (NO) is obtained in step S3, the control flow goes to step S5 for executing a normal control routine illustrated in detail in the flow chart of FIG. 3. If an affirmative decision (YES) is obtained in step S2, that is, if the engine 12 fails to normally function, the control flow goes to step S6 for executing an engine-failure special control routine illustrated in the flow chart of FIG. 4. If an affirmative decision (YES) is obtained in step S3, that is, the electric motor 14 fails to normally function, the control flow goes to step S4 for executing a motor-failure special control routine illustrated in the flow chart of FIG. 5. If a negative decision (NO) is obtained in steps S2 and S3, that is, if both of the engine 12 and the electric motor 14 normally function, the control flow goes to step S5 for executing a normal control routine illustrated in the flow chart of FIG. 3.

The normal control routine will be described by reference to the flow chart of FIG. 3. This routine is initiated with step S5-1 to calculate a required power PL necessary to drive the motor vehicle in the present running condition of the vehicle. This required power PL, which is an amount of power required by the vehicle operator, may be calculated based on the detected amount of operation $\theta_{AC}$ of the accelerator pedal or a rate of change of this amount $\theta_{AC}$ and the vehicle running speed V, for example. The required power PL may be obtained according to a predetermined equation or data map stored in the ROM of the controller 28. In the present embodiment, the required power PL is calculated on the basis of the currently required output of the hybrid drive system as represented by the currently dtected operation amount $\theta_{AC}$ of the accelerator pedal by the operator and the currently detected vehicle speed V. Step S5-1 is followed by step S5-2 to determine whether the amount of electric energy SOC stored in the electric energy storage device 36 is equal to or larger than a predetermined lower limit A. If an affirmative decision (YES) is obtained in step S3-2, the control flow goes to step S5-3 and the following steps. If a negative decision (NO) is obtained in step S5-2, the control flow goes to step S5-8 to implement an electricity generating drive mode sub-routine. The lower limit A is the minimum amount of the electric energy required to operate the electric motor 14 for driving the motor vehicle in an engine•motor drive mode or a motor drive mode in which the electric motor 14 is operated as the drive power source, as described below with respect to steps S5-5 and S5-7. The lower limit A is determined depending upon the charging and discharging efficiencies of the electric energy storage device 35. For example, the lower limit A is in the neighborhood of 70% of the full capacity of the device 36. In the electricity generating drive mode sub-routine in step S5-8, the hybrid drive system 10 is operated in an electricity generating drive mode in which the engine 12 is operated so as to provide an output which is larger than the calculated required power PL, and the electric motor 14 is operated as the electric generator with the surplus power which is a difference between the engine output and the required power PL, so that the electric energy generated by the electric generator 14 is stored in the electric energy storage device 36. Described more specifically, the controller 28 controls the M/G control device 34 such that the surplus power of the engine which is the output of the engine 12 minus the calculated required power PL is consumed by the electric generator 14 while the calculated required power PL is transmitted from the engine 12 to the transmission 16 for driving the vehicle. The torque $T_E$ and speed Ne of the engine 12 and the electric generator 14 are controlled depending upon the position of the transmission 16 selected in the normal shift control in step S5-9 (which will be described) and the expected power loss of the system.

Step S5-3 implemented when the affirmative decision (YES) is obtained in step S5-2 is provided to determine whether the required power PL is larger than a predetermined first threshold value B. This determination is effected based on the current running condition of the vehicle as represented by the currently required drive torque and the currently detected vehicle speed V. If an affirmative decision (YES) is obtained in step S5-3, the control flow goes to step S5-4 to determine whether the required power PL is larger than a predetermined second threshold value C which is larger than the first threshold value B. If a negative decision (NO) is obtained in step S5-3, that is, if the required power PL is equal to or smaller than the first threshold value B, it means that the running condition of the motor vehicle is a low-load area in which the load acting on the hybrid drive system 10 is relatively low. In this case, the control flow goes to step S5-7 to implement a motor drive mode sub-routine. If an affirmative decision (YES) is obtained in step S5-3 while a negative decision (NO) is obtained in step S5-4, that is, if the required power PL is larger than the first threshold value B and is equal to or smaller than the second threshold value C, it means that the load acting on the hybrid drive system 10 is medium. In this case, the control flow goes to step S5-6 to implement an engine drive mode sub-routine. If an affirmative decision (YES) is obtained in step S5-4, that is, the required power PL is larger than the second threshold value C, it means that the load acting on the hybrid drive system 10 is relatively high. In this case, the control flow goes to step S5-5 to implement an engine•motor drive mode sub-routine.

In the motor drive mode sub-routine in step S5-7, the hybrid drive system 10 is operated in the motor drive mode indicated above with respect to the lower limit A. In the motor drive mode, only the electric motor 14 is operated as the drive power source for running the vehicle. In the engine drive mode sub-routine in step S5-6, the hybrid drive system 10 is operated in an engine drive mode in which only the engine 12 is operated as the drive power source for running the vehicle. In the engine•motor drive sub-routine in step S5-5, the hybrid drive system 10 is operated in the engine•motor drive mode indicated above with respect to the lower limit A. In the engine•motor drive mode, the engine 12 and the electric motor 14 are both operated as the drive power sources for running the vehicle. In these drive modes in steps S5-5, S5-6 and S5-7, the outputs of the engine 12 and electric motor 14 are controlled depending upon the position of the transmission 16 selected in step S5-9 and the expected power loss. In the engine drive mode in step S5-6, the electric motor 14 is held in a non-load condition. In the motor drive mode in step S5-7, the clutch 30 is placed in the released state so that the output of the electric motor 14 is transmitted to only the transmission 16.

Figure 6:
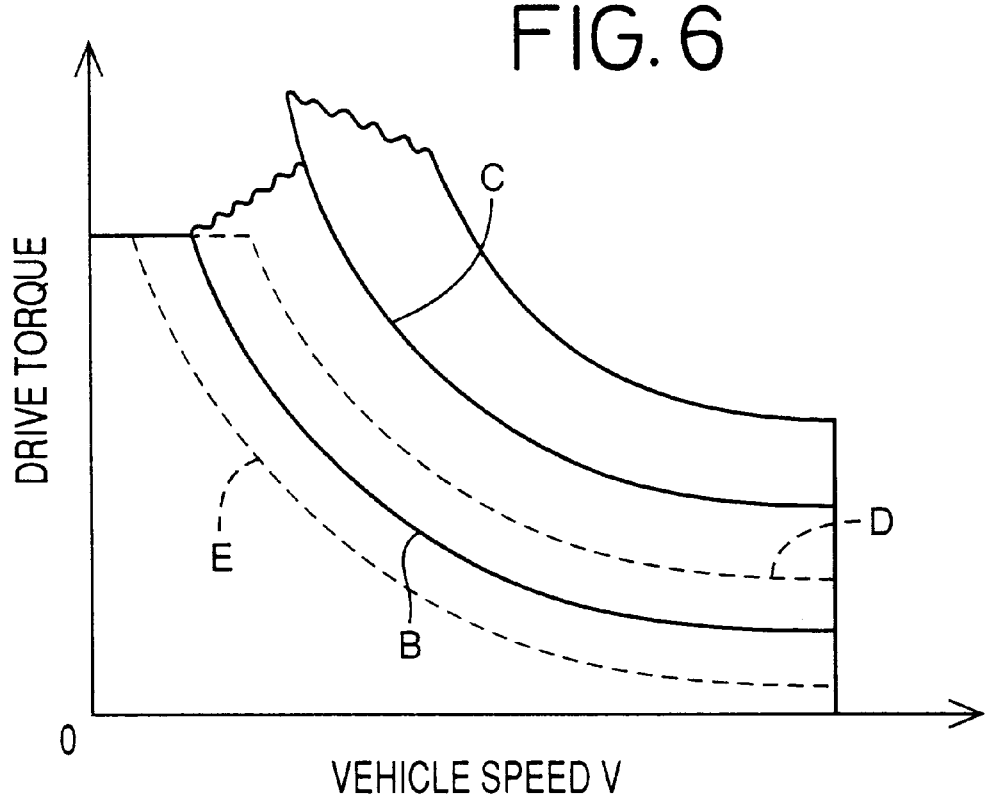
FIG. 6 is a graph for explaining threshold values B and C used in the normal control routine of FIG. 3, a threshold value D used in the engine-failure special control routine of FIG. 4, and a threshold value E used in the motor-failure special control routine of FIG. 5.

Each of the first and second threshold values B and C may be represented by a relationship between the current running condition of the vehicle as represented by the currently required vehicle drive torque and the currently detected vehicle speed V, as shown in FIG. 6 by way of example. This relationship (as represented by a solid-line curve) is provided for each of the forward-drive positions of the transmission 16. When the running condition of the vehicle as represented by the drive torque and speed V is in a low-load area on a lower load side of the solid-line curve representative of the first threshold B, namely, on the side nearer to the origin "0", it means that the required power PL is equal to or smaller than the first threshold B. In this case, step S5-7 is implemented to execute the motor drive mode sub-routine. When the running condition is in an area between the solid-line curve representative of the first threshold B and the solid-line curve representative of the second threshold C, it means that the required power PL is larger than the first threshold B and is equal to or smaller than the second threshold C. In this case, step S5-6 is implemented to execute the engine drive mode sub-routine. When the running condition is in an area on a higher load side of the solid-line curve representative of the second threshold C, it means that the required power PL is larger than the second threshold C. In this case, step S5-5 is implemented to execute the engine•motor drive mode sub-routine. The above relationship may be determined to determine the first threshold value B on the basis of the fuel consumption efficiency (amount of consumption of fuel per unit power) and emission gas ratio (amount of the emission gas per unit power) of the engine 12 and the energy conversion efficiency of the electric motor 14, for minimizing the amount of fuel consumption and the amount of emission gas of the engine 12.

In the present embodiment, the motor drive mode is considered a low-load drive motor which is selected when the vehicle running condition represented by the vehicle drive torque and the speed V is in a low-load range in the form of a low-load area whose upper limit is defined by the first threshold value B. In this low-load range or area, the load acting on the hybrid drive system 10 is relatively low, with the currently required power PL being relatively small. Further, the engine drive mode and the engine•motor drive modes are considered to be a high-load drive mode which is selected when the vehicle running condition is in a high-load range in the form of a high-load area whose lower and upper limits are defined by the first and second threshold values B and C, respectively. In this high-load range or area, the load acting on the hybrid drive system 10 is relatively high, with the currently required power PL being relatively large.

Figure 7:
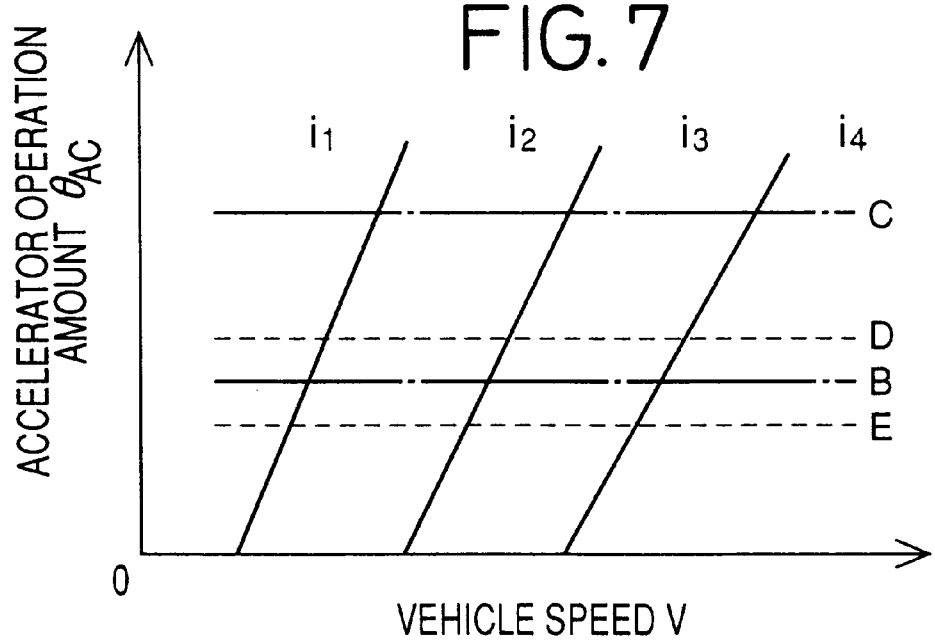
FIG. 7 is a graph indicating shift patterns for shifting a transmission in step S5-9 of the normal control routine of FIG. 3.

In step S5-9, the transmission 16 is shifted to one of its four forward-driving positions which is selected on the basis of the detected amount of operation $\theta_{AC}$ of the accelerator pedal and the detected vehicle speed V, and according to predetermined normal shift patterns represented by three solid lines as indicated in FIG. 7 by way of example. The four forward-driving positions of the transmission 16 have respective speed ratios $i_1$, $i_2$, $i_3$ and $i_4$, where $i_1 > i_2 > i_3 > i_4$. The speed ratio i is represented as Ni/No, where Ni and No represent the rotating speeds of the input and output shafts of the transmission 16, as described above. Values B and C indicated by one-dot chain lines in FIG. 7 correspond to the first and second threshold values B and C. If the running condition of the vehicle as represented by $\theta_{AC}$ and V is in an area below the one-dot chain line representative of the value B, the drive system 10 is placed in the motor drive mode in which the vehicle is driven by only the electric motor 14. When the vehicle running condition is in an area between the one-dot chain lines representative of the values B and C, the drive system 10 is placed in the engine drive mode in which the vehicle is driven by only the engine 12. When the vehicle running condition is in an area above the one-dot chain line representative of the value C, the drive system 10 is placed in the engine•motor drive mode in which the vehicle is driven by both the engine 12 and the electric motor 14.

The engine-failure special control routine in step S6 of FIG. 2 which is executed in the event of a failure of the engine 12 will be described by reference to the flow chart of FIG. 4. This engine-failure special control routine is initiated with step S6-1 to calculate a required power PL necessary to drive the motor vehicle in the present running condition of the vehicle, as in step S5-1 of FIG. 3. Then, the control flow goes to step S6-2 to determine whether the calculated required power Pl is equal to or smaller than a predetermined third threshold value D which is larger than the first threshold value B. If an affirmative decision (YES) is obtained in step S6-2, the control flow goes to step S6-3 to operate the electric motor 14 so as to produce the calculated required power PL for driving the vehicle. If a negative decision (NO) is obtained in step S6-2, that is, if the calculated required power PL is larger than the third threshold value D, the control flow goes to step S6-4 to provide a visual or audio indication that the output of the electric motor 14 cannot be increased above the upper limit D in the engine-failure drive control in the event of a failure of the engine 12. Step S6-4 is followed by step S6-5 to operate the electric motor 14 so as to produce an output or power corresponding to the third threshold value D. Thus, the upper limit of the output of the electric motor 14 is increased from the value B indicated by the solid line in FIG. 6 to the value D indicated by the broken line in FIG. 6, in the event of a failure of the engine 12.

Figure 4:
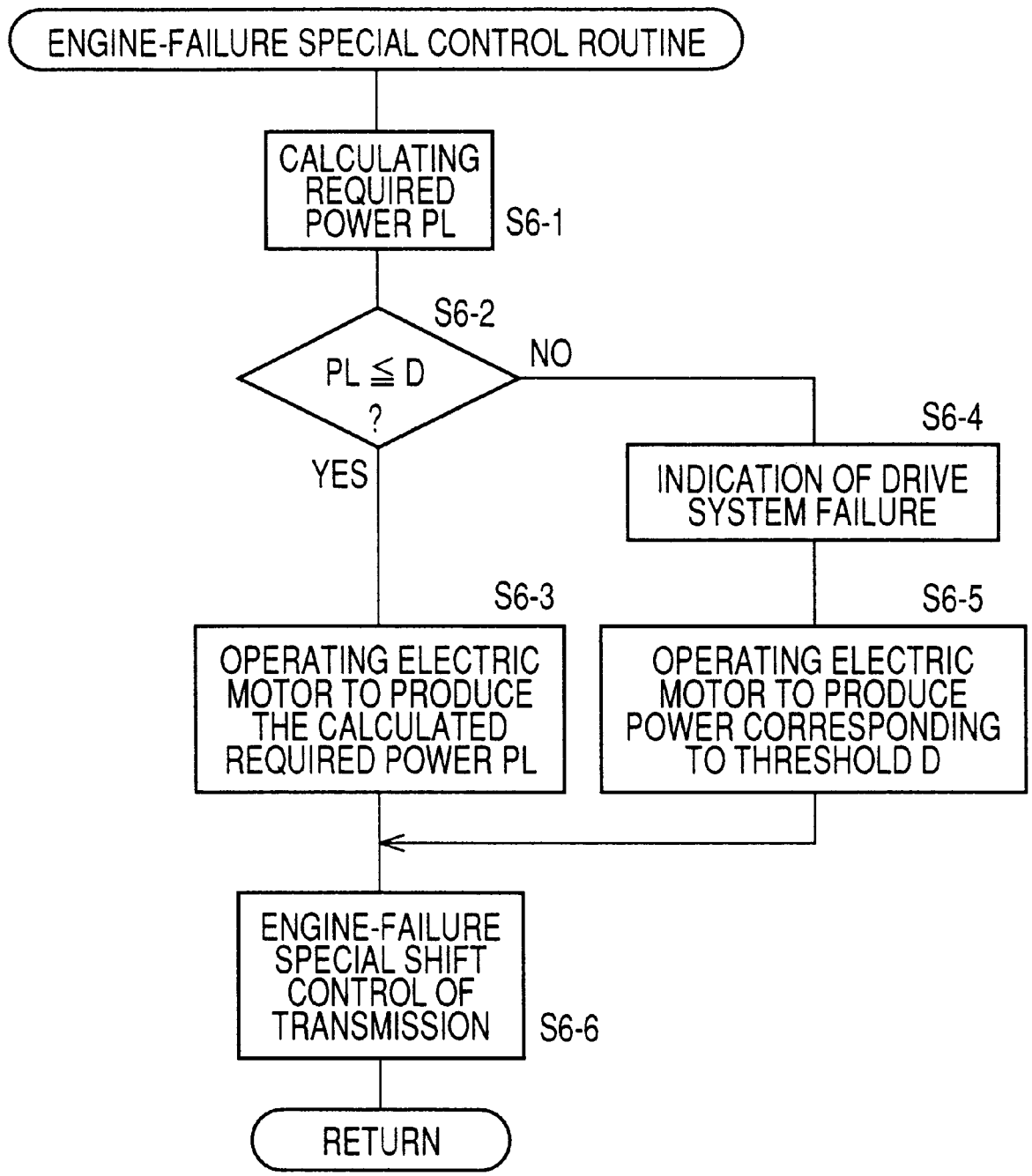
FIG. 4 is a flow chart showing in detail an engine-failure special control routine in step S6 of the basic routine of FIG. 2, which is executed in the event of a failure of the engine.

It will be understood that a portion of the controller 28 assigned to implement steps S6-2, S6-3 and S6-5 of the flow chart of FIG. 4 constitutes range changing means for changing the low-load range for selecting the motor drive mode when the electric motor 14 is operated as the drive power source in the event of a failure of the engine 12. More particularly, those steps S6-2, S6-3 and S6-5 correspond to upper limit changing means for enlarging the low-load range by increasing the upper limit from the first threshold value B to the third threshold value D, as described above, so that the electric motor 14 is operated so as to produce the power corresponding to the upper limit D of the enlarged low-load range. The third threshold value D is determined so as to satisfy a predetermined requirement or requirements for driving the vehicle by the electric motor 14. For example, the value D is determined so as to permit the vehicle to run at a speed higher than a given lower limit Y (km/h) under a given condition (e.g., given gradient X° of the road surface), or so as to permit the vehicle to be accelerated at a rate higher than a given lower limit Z (G) under a given condition. It will also be understood that a portion of the controller 28 assigned to execute the engine-failure special drive control routine of FIG. 4 constitutes emergency drive control means operated in the event of a failure of the engine 12, for operating the electric motor 14 to drive the motor vehicle.

Step S6-3 and S6-5 are followed by step S6-6 in which the transmission 16 is shifted according to engine-failure special shift patterns, which are formulated to shift the transmission 16 to an appropriate one of the four forward-driving positions, so that the vehicle is driven by only the electric motor 14 with an amount of power not larger than the upper limit D. Described in detail, the engine-failure special shift patterns are formulated to suitably shift the transmission 16 so that the amount of operation $\theta_{AC}$ of the accelerator pedal may be held within an area below the broken line representative of the threshold value D as indicated in the graph of FIG. 7. The special shift patterns are represented by data map stored in the controller 28. The predetermined relationship or equation for obtaining the required power PL in the event of a failure of the engine 12 may be formulated such that the required power PL when the accelerator pedal operation amount $\theta_{AC}$ is 100% is equal to the upper limit D of the enlarged low-load area. In this case, the engine-failure special shift patterns may be formulated over the entire 100% range of the accelerator pedal operation amount $\theta_{AC}$.

It will be understood that a portion of the controller 28 assigned to implement step S6-6 constitutes emergency shift control means for changing a predetermined relationship between the running condition of the vehicle and the speed ratio or operating position of the transmission 16 that should be selected when the electric motor 14 is operated to drive the vehicle in the event of a failure of the engine 12.

The engine-failure special shift patterns may be suitably formulated so as to satisfy a predetermined requirement or requirements. For example, the solid shift boundary lines of FIG. 7 for selectively establishing the four forward-driving positions of the transmission 16 in the motor drive mode may be moved to the right so that the transmission 16 tends to be placed in a relatively low-gear position (having a relatively high speed ratio i=Ni/No) according to the engine-failure special shift patterns, than according to the normal shift patterns, for increasing the drivability of the vehicle during uphill road running. Further, the special shift patterns may be determined so as to permit the vehicle to run at a speed higher than a given lower limit Y (km/h) under a given condition (e.g., given gradient X° of the road surface), or so as to permit the vehicle to be accelerated at a rate higher than a given lower limit Z (G) under a given condition. Alternatively, the special shift patterns used in step S6-6 may be formulated so as to minimize the amount of consumption of the electric energy by the electric motor 14. The amount of electric energy consumption by the electric motor 14 is considered to be an amount of consumption $E_{BOUT}$ of electric energy in a battery of the electric energy storage device 36. The battery energy consumption amount $E_{BOUT}$ is calculated according to the following equation (1):

$$E_{BOUT} = PL/(\eta_T \times \eta_M) \quad (1)$$

where, $\eta_T$: power transfer efficiency of the transmission 16

$\eta_M$: energy conversion efficiency of the motor 14

The battery energy consumption amount $E_{BOUT}$ changes depending upon the selected position of the transmission 16. For minimizing the amount of consumption of the electric energy by the electric motor 14, the transmission 16 is shifted to one of the four forward-driving positions at which the battery energy consumption amount $E_{BOUT}$ is minimum. In this case, step S6-6 corresponds to energy-saving shift control means for shifting the transmission 16 to control its speed ratio so as to minimize the amount of consumption of the electric energy by the electric motor 14 in the event of a failure of the engine 12, depending upon at least one of the power transfer efficiency $\eta_T$ of the transmission 16 and the energy conversion efficiency $\eta_M$ of the electric motor 14.

The power transfer efficiency $\eta_T$ of the transmission 16 may be obtained on the basis of the selected position of the transmission 16 and the torque transmitted through the transmission 16. The energy conversion efficiency $\eta_M$ of the electric motor 14 may be obtained on the basis of the torque and speed of the motor 14.

In the engine-failure special drive control routine of FIG. 4, the low-load area for driving the vehicle in the motor drive mode in the event of a failure of the engine 12 is enlarged by increasing the upper limit from the first threshold value B to the third threshold value D, so that the vehicle can be driven by only the electric motor 14 under a higher load (e.g., on an uphill road) than in the motor drive mode when the engine 12 is normal. Further, the transmission 16 is shifted according to the engine-failure, special shift patterns which are formulated so that the vehicle can be suitably driven by only the electric motor 14 with a power not larger than the upper limit D, while minimizing the amount of consumption of the electric energy by the electric motor 14. Thus, the present hybrid drive system 10 is capable of controlling the electric motor 14 and the transmission 16 to drive the vehicle with improved drivability and reduced electric energy consumption by the electric motor 14, in the motor drive mode even in the event of a failure of the engine 12. The present arrangement is effective to increase the running distance of the vehicle by the electric energy stored in the electric energy storage device 36, increasing the possibility that the vehicle can be driven to the desired destination. Even when the engine 12 is defective, the storage device 36 may be more or less charged by regenerative braking, but the amount of charging in this case is smaller than when the engine 12 is normal and used to charge the storage device 36 in the electricity generating drive mode in step S5-8.

In the case where the engine-failure special shift patterns are formulated so as to minimize the electric energy consumption by the electric motor 14 depending upon the power transfer efficiency $v_T$ of the transmission 16 and the energy conversion efficiency $\eta_M$ of the electric motor 14, the electric energy consumption is further reduced, leading to an increase in the running distance of the vehicle in the motor drive mode in the event of a failure of the engine 12.

Figure 3:
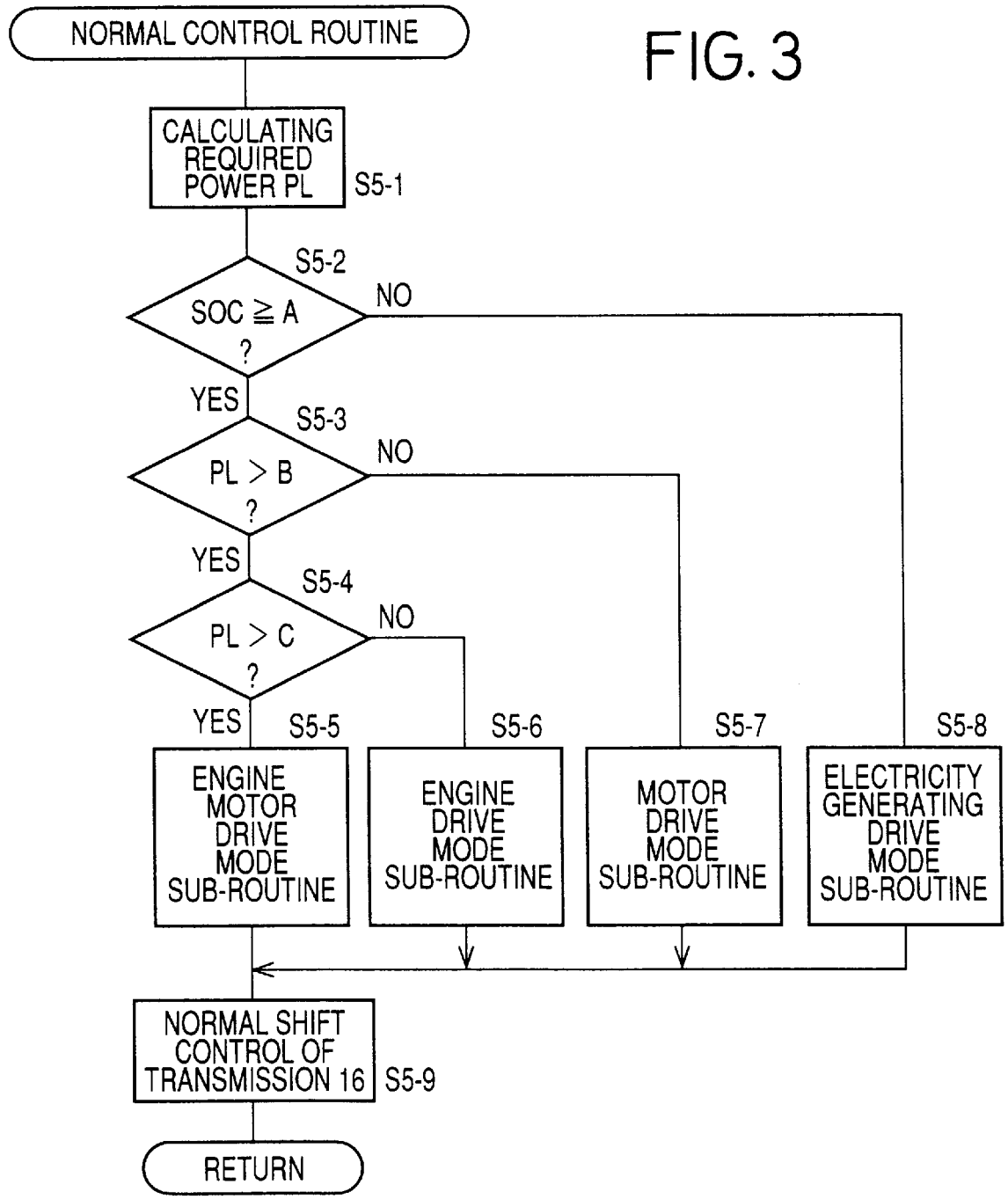
FIG. 3 is a flow chart showing in detail a normal control routine in step S5 of the basic routine of FIG. 2, which is executed when the engine and the electric motor of the system are normal.

In the engine-failure special drive control routine of FIG. 4 (step S6 of the basic control routine of FIG. 2), the electricity generating drive mode which would be available in step S5-8 of the normal drive control routine of FIG. 3 is not available even when the amount of electric energy SOC stored in the storage device 36 is smaller than the lower limit A. In other words, the vehicle running by the electric motor 14 in the motor drive mode is continued even after the stored electric energy amount SOC becomes smaller than the lower limit A, leading to an increase in the distance of running of the vehicle by the electric motor 14 and making it possible to drive the vehicle to the desired destination even in the event of a failure of the engine 12. It will therefore be understood that a portion of the controller 28 assigned to implement step S6 of FIG. 2 constitutes means for reducing the lower limit A of the electric energy amount SOC above which the electric energy stored in the storage device 36 is permitted to be consumed by the electric motor 14.

In the illustrated embodiment of FIG. 4, the low-load area for selecting the motor drive mode is enlarged by increasing the upper limit from the normal value B to the value D in the event of a failure of the engine 12. However, the low-load area may be narrowed by reducing the upper limit from the normal value B to a value E as indicated by a lower broken line in the graph of FIG. 6, by way of example. In this case, the electric energy consumption by the electric motor 14 is reduced to increase the distance of running of the vehicle by operation of the electric motor 14 by the electric energy stored in the storage device 36. In this case, the hybrid drive system 10 is modified to include upper limit changing means for narrowing the low-load area by reducing the upper limit when the electric motor 14 is operated in the event of a failure of the engine 12.

The motor-failure special control routine in step S4 of FIG. 2 which is executed in the event of a failure of the electric motor 14 will be described by reference to the flow chart of FIG. 5. This motor-failure special control routine is initiated with step S4-1 to calculate the required power PL as in step S6-1. Then, the control flow goes to step S4-2 to determine whether the calculated required power Pl is equal to or smaller than a predetermined fourth threshold value E which is smaller than the first threshold value B. If an affirmative decision (YES) is obtained in step S4-2, the control flow goes to step S4-3 to operate the engine 12 so as to produce the calculated required power PL for driving the vehicle. If a negative decision (NO) is obtained in step S4-2, that is, if the calculated required power PL is larger than the fourth threshold value E, the control flow goes to step S4-4 to provide a visual or audio indication that the output of the engine 12 cannot be lowered below the lower limit E in the motor-failure special drive control in the event of a failure of the electric motor 14. Step S4-4 is followed by step S4-5 to operate the engine 12 so as to produce an output or power corresponding to the fourth value E. Thus, the lower limit of the output of the engine 12 is reduced from the normal value B to the value E as indicated in FIG. 6, in the event of a failure of the electric motor 14, whereby the high-load area for driving the vehicle by the engine 12 is enlarged.

Figure 5:
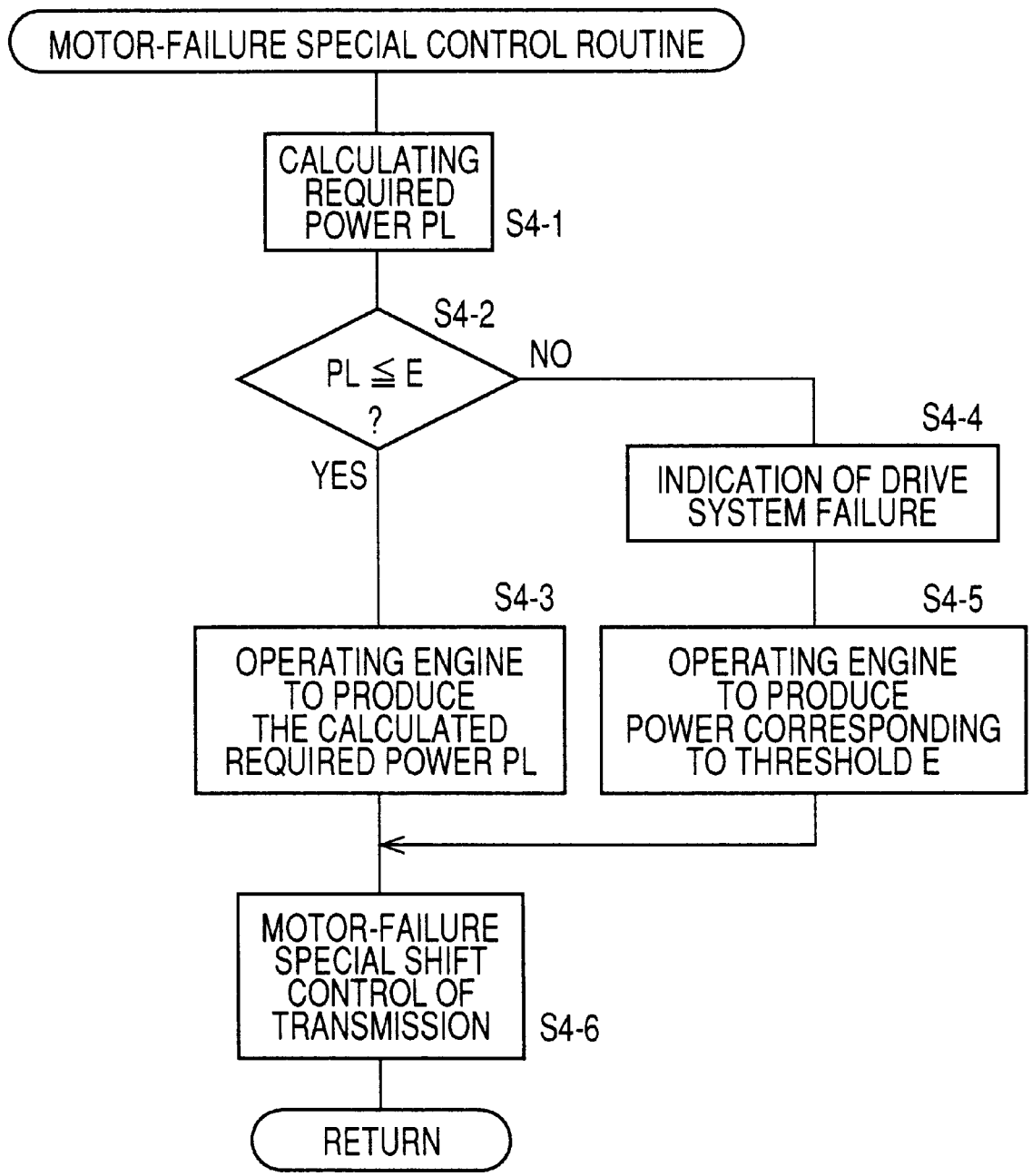
FIG. 5 is a flow chart showing in detail a motor-failure special control routine in step S4 of the basic routine of FIG. 2, which is executed in the event of a failure of the electric motor.

It will be understood that a portion of the controller 28 assigned to implement steps S4-2, S4-3 and S4-5 of the flow chart of FIG. 5 constitutes range changing means for changing a high-load range in the form of the high-load area for selecting the high-load drive mode when the engine 12 is operated as the drive power source in the event of a failure of the electric motor 12. Described more particularly, those steps S4-2, S4-3 and S4-4 correspond to lower limit changing means for enlarging the high-load range or area by reducing the upper limit from the first threshold value B to the fourth threshold value E, as described above, so that the engine 12 is operated so as to produce the power corresponding to the lower limit E of the enlarged high-load range or area. The fourth threshold value E is determined, for example, so as to permit the vehicle to be run at a speed low enough to smoothly start and stop the vehicle. It will also be understood that a portion of the controller 28 assigned to execute the motor-failure special drive control routine of FIG. 5 constitutes emergency drive control means operated in the event of a failure of the electric motor 14, for operating the engine 12 to drive the motor vehicle.

Step S4-3 and S4-5 are followed by step S4-6 in which the transmission 16 is shifted according to motor-failure special shift patterns, which are formulated to shift the transmission 16 to an appropriate one of the four forward-driving positions, so that the vehicle is driven by only the engine 12 with an amount of power not smaller than the lower limit E. Described in detail, the motor-failure special shift patterns are formulated to shift the transmission 16 to the position for minimum amount of fuel consumption by the engine 12 while maintaining the amount of operation $\theta_{AC}$ of the accelerator pedal within an area above the broken line representative of the threshold value E as indicated in the graph of FIG. 7. The motor-failure special shift patterns are represented by data map stored in the controller 28. The predetermined relationship or equation for obtaining the required power PL in the event of a failure of the electric motor 14 may be formulated such that the required power PL when the accelerator pedal operation amount $\theta_{AC}$ is 0% is equal to the lower limit E of the enlarged high-load area. In this case, the motor-failure special shift patterns may be formulated over the entire 100% range of the accelerator pedal operation amount $\theta_{AC}$.

It will be understood that a portion of the controller 28 assigned to implement step S4-6 constitutes emergency shift control means for changing a predetermined relationship between the running condition of the vehicle and the speed ratio or operating position of the transmission 16 that should be selected when the engine 12 is operated to drive the vehicle in the event of a failure of the electric motor 14.

In the motor-failure special drive control routine of FIG. 6, the high-load area for driving the vehicle in the engine drive mode in the event of a failure of the electric motor 14 is enlarged by reducing the lower limit from the first threshold value B to the fifth threshold value B, so that the vehicle can be driven by only the engine 12 at a relatively low speed and can be smoothly started and stopped. Further, the transmission 16 is shifted according to the motor-failure special shift patterns which are formulated so that the vehicle can be run with high drivability by only the engine 12 with a power not smaller than the lower limit E, while minimizing the fuel consumption by the engine 12. Thus, the present hybrid drive system 10 is capable of controlling the engine 12 and the transmission 16 to drive the vehicle with improved drivability and reduced fuel consumption by the engine 12, in the engine drive mode even in the event of a failure of the electric motor 14. The present arrangement makes it possible to drive the vehicle in the engine drive mode in the event of a failure of the electric motor 14, in a running condition in which the engine drive mode could not be established in the prior art hybrid drive system. Accordingly, this arrangement is effective to increase the possibility that the vehicle can be driven to the desired destination.

As described above, the present hybrid drive system 10 is constructed to permit the vehicle to be driven to the desired destination by the normal one of the engine 12 and the electric motor 14, even in the event of a failure of the other drive power source.

Referring next to FIGS. 8–12, there will be described a second embodiment of this invention. In FIGS. 8–12, the same reference numerals and step numbers as used in the first embodiment will be used to identify the corresponding elements or process steps.

Figure 8:
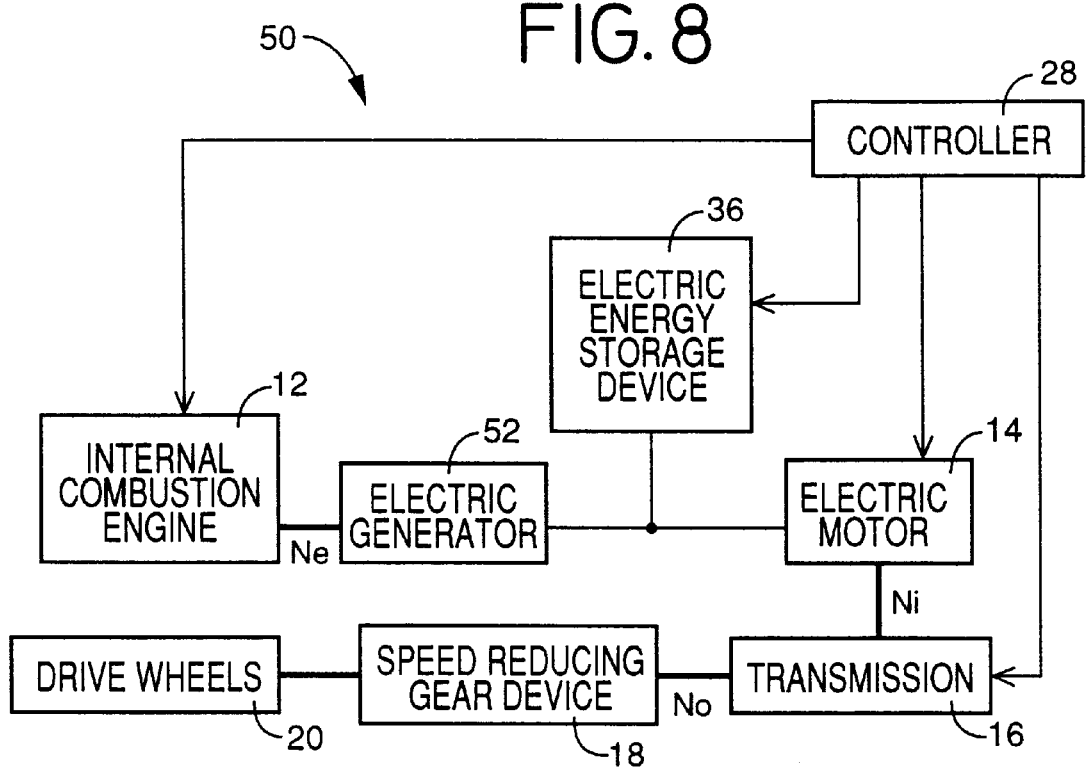
FIG. 8 is a block diagram illustrating a series type hybrid drive system constructed according to another embodiment of this invention.

A series type hybrid drive system according to the present second embodiment is indicated generally at 50 in the block diagram of FIG. 8. The hybrid drive system 50 includes an electric generator 52 operated by the engine 12 to generate an electric energy, so that the electric motor 14 is operated by the electric energy generated by the electric generator 52 and/or the electric energy stored in the electric energy storage device 36. In this hybrid drive system 50, the electric motor 14 is used as a single drive power source for driving the the vehicle.

Figure 9:
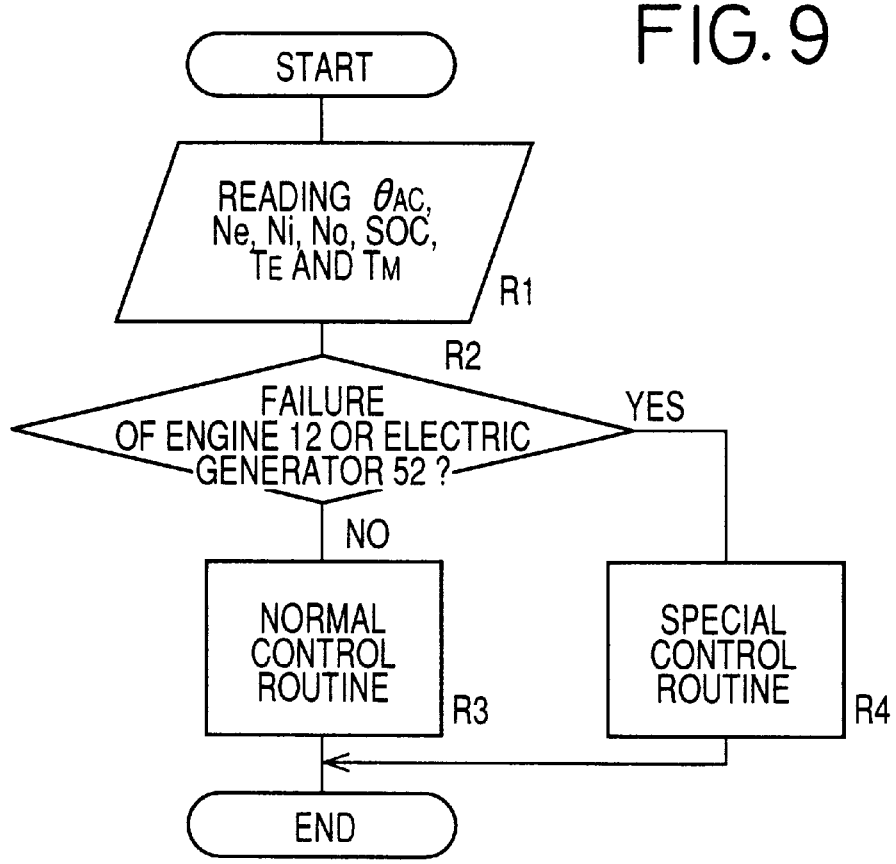
FIG. 9 is a flow chart for explaining a basic routine executed by the hybrid drive system of FIG. 8.

Referring to the flow chart of FIG. 9, a basic control routine executed by the present hybrid drive system 50 will be described. The routine is initiated with step R1 to read the amount of operation $\theta_{AC}$ of the accelerator pedal, the engine speed Ne, the input shaft speed Ni and output shaft No of the transmission 16, the amount of electric energy SOC stored in the electric energy storage device 36, the torque $T_E$ of the engine 12 and the torque $T_M$ of the electric motor 14. Then, the control flow goes to step R2 to determine whether the engine 12 or electric generator 52 fails to normally function. If a negative decision (NO) is obtained in step R2, the control flow goes to step R3 to execute a normal control routine illustrated in detail in the flow chart of FIG. 10. If an affirmative decision (YES) is obtained in step R4, that is, if the engine 12 or the electric generator 52 fails to normally function, the control flow goes to step Sr for executing a special control routine illustrated in the flow chart of FIG. 11. The determination as to whether the engine 12 fails to normally function can be effected based on the relationship between the engine torque $T_E$ (which may be obtained from the opening angle of the throttle valve) and the engine speed Ne. The determination as to whether the electric generator 52 fails to normally function can be effected based on the relationship between the operating speed of the electric generator 52 (which is equal to the engine speed Ne) and the electric current generated by the electric generator 52.

Figure 10:
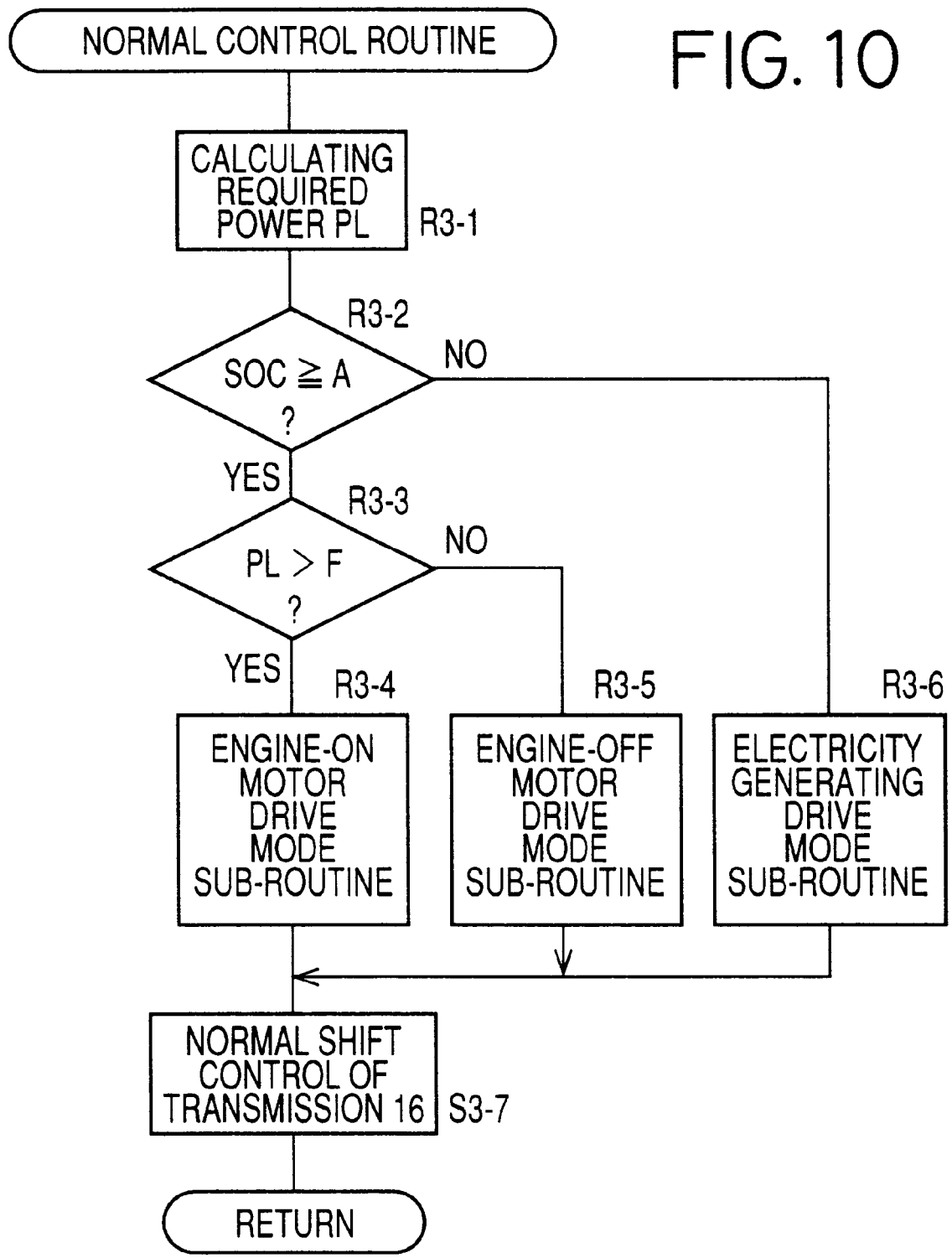
FIG. 10 is a flow chart showing in detail a normal control routine in step R3 of the basic routine of FIG. 9, which is executed when the engine and the electric generator of the system are normal.

The normal control routine will be described by reference to the flow chart of FIG. 10. This routine is initiated with step R3-1 to calculate a required power PL necessary to drive the motor vehicle in the present running condition of the vehicle, as in step S5-1. Step R3-1 is followed by step R3-2 to determine whether the amount of electric energy SOC stored in the electric energy storage device 36 is equal to or larger than a predetermined lower limit A. If an affirmative decision (YES) is obtained in step R3-2, the control flow goes to step R3-3 and the following steps. If a negative decision (NO) is obtained in step R3-2, the control flow goes to step R3-6 to implement an electricity generating drive mode sub-routine. In the electricity generating drive mode sub-routine in step R3-6, the hybrid drive system 50 is operated in an electricity generating drive mode in which the electric motor 14 is operated to drive the vehicle with the calculated required power PL, while at the same time the engine 12 is operated to drive the electric generator 52 so that the electric energy generated by the electric generator 52 is larger than the electric energy consumed by the electric motor 14, and the surplus electric energy is stored in the storage device 36. The output of the electric motor 14 is controlled by taking into account the speed ratio of the transmission 16 which is controlled in step R3-7.

Step R3-3 implemented when the affirmative decision (YES) is obtained in step R3-2 is provided to determine whether the required power PL is larger than a predetermined first threshold value F. If an affirmative decision (YES) is obtained in step R3-3, the control flow goes to step R3-4 to implement an engine-on motor drive mode sub-routine. If a negative decision (NO) is obtained in step R3-3, the control flow goes to step R3-5 to implement an engine-off motor drive mode sub-routine. In the engine-on motor drive mode sub-routine in step R3-4, the engine 12 is operated to operate the electric generator 52 to generate an electric energy, while at the same time the electric motor 14 is operated to drive the vehicle with the calculated required power Pl. If the amount of the electric energy generated by the electric generator 52 is larger than the amount of electric energy consumption by the electric motor 14, the surplus electric energy is stored in the electric energy storage device 36. In the engine-off motor drive mode sub-routine in step R3-6, the electric motor 14 is operated to drive the vehicle with the required power PL, while the engine 12 is held at rest. The first threshold value F may be determined depending upon the current running condition of the vehicle, for instance, on the basis of the vehicle drive torque and the vehicle speed V and according to a predetermined relationship as shown in FIG. 12 by way of example. This relationship is provided for each of the forward-drive positions of the transmission 16. When the running condition of the vehicle as represented by the drive torque and speed V is in an area on a lower load side of a solid-line curve representative of the first threshold value F, namely, on the side nearer to the origin "0", it means that the required power PL is equal to or smaller than the first threshold value F. In this case, step R3-5 is implemented to execute the engine-off motor drive mode sub-routine. When the running condition is in an area on the other higher-load side of the solid-line curve representative of the first threshold value F, it means that the required power PL is larger than the threshold value F. In this case, step R3-4 is implemented to execute the engine-on motor drive mode sub-routine. In these engine-on and engine-off motor drive mode sub-routines, the output of the electric motor 14 is controlled in view of the speed ratio of the transmission 16 controlled in step R3-7.

In the last step R3-7, the transmission 16 is shifted to one of its four forward-driving positions which is selected on the basis of the detected amount of operation $\theta_{AC}$ of the accelerator pedal and the detected vehicle speed V, and according to predetermined normal shift patterns (normal relationship between the vehicle running condition and the speed ratio of the transmission 16).

The special control routine in step R4 of FIG. 9 which is executed in the event of a failure of the engine 12 or the electric generator 52 will be described by reference to the flow chart of FIG. 11. This special control routine is initiated with step R4-1 to calculate a required power PL necessary to drive the motor vehicle in the present running condition of the vehicle, as in step R3-1 of FIG. 10. Then, the control flow goes to step R4-2 to determine whether the calculated required power Pl is equal to or smaller than a predetermined second threshold value G which is larger than the first threshold value B. If an affirmative decision (YES) is obtained in step R4-2, the control flow goes to step R4-3 to operate the electric motor 14 so as to produce the calculated required power PL for driving the vehicle. If a negative decision (NO) is obtained in step R4-4, that is, if the calculated required power PL is larger than the second threshold value G, the control flow goes to step R4-4 to provide a visual or audio indication that the output of the electric motor 14 cannot be increased above the upper limit G in the special drive control in the event of a failure of the engine 12 or electric generator 52. Step R4-4 is followed by step R4-5 to operate the electric motor 14 to drive the vehicle, with the output or power corresponding to the second threshold value G. In this special drive control routine, the electric motor 14 is operated in the event of a failure of the engine 12 or electric generator 52, even when the amount of electric energy SOC stored in the storage device 36 is smaller than the predetermined lower limit A, whereby the entire amount of the electric energy stored in the storage device 36 can be used the electric motor 14, if necessary to operate to drive the vehicle with the required power PL.

It will be understood that the second threshold value G defines the upper limit of the load which acts on the electric motor 12 when the electric motor is operated in the event of a failure of the engine 12 or electric generator 52. It will also be understood that a portion of the controller 28 assigned to implement step R4 of FIG. 9 (special drive control routine of FIG. 11) constitutes emergency motor drive control means operated in the event of a failure of the engine or the electric generator, for operating the electric motor to drive the motor vehicle such that a load acting on the electric motor is smaller than a predetermined upper limit (G), and such that the electric motor is permitted to consume an entire amount of the electric energy stored in the electric energy storage device, if necessary to drive the motor vehicle.

Step R4-3 and R4-5 are followed by step R4-6 in which the transmission 16 is shifted according to special shift patterns, which are formulated to shift the transmission 16 to an appropriate one of the four forward-driving positions, as in step S6-6 of the first embodiment, so that the vehicle is driven by the electric motor 14 with an amount of power not larger than the upper limit G. Step R4-6 may be formulated to control the transmission 16 so as to minimize the battery consumption amount $E_{BOUT}$ calculated according to the above equation (1). That is, step R4-6 may be formulated such that the transmission 16 is shifted to one of the four forward-driving positions at which the battery energy consumption amount $E_{BOUT}$ is minimum. In this case, step R4-6 corresponds to energy-saving shift control means for shifting the transmission 16 to control its speed ratio so as to minimize the amount of consumption of the electric energy by the electric motor 14 in the event of a failure of the engine 12, depending upon at least one of the power transfer efficiency $\eta_T$ of the transmission 16 and the energy conversion efficiency $\eta_M$ of the electric motor 14.

In the hybrid drive system according to the present second embodiment of FIGS. 8–12, the vehicle is driven by the electric motor 14 under a relatively low load not higher than the upper limit G, in the event of a failure of the engine 12 or the electric generator 52. Since the maximum output of the electric motor 14 is limited to the upper limit G (larger than the normal upper limit F), the amount of electric energy consumption by the electric motor 14 is reduced, so that the vehicle can be driven a relatively long distance by the electric motor 14 by the electric energy stored in the storage device 36, even in the event of a failure of the electric generator 52 to generate the electric energy. Further, the entire amount of the electric energy stored in the storage device 36 can be used by the electric motor 36, if necessary to drive the vehicle to the desired destination, in the event of a failure of the engine 12 or electric generator 52, that is, even if the storage device 36 cannot be charged due to the failure of the engine or generator. In the present hybrid drive system, too, the storage device 36 is charged by regenerative braking of the electric motor 14. However, the failure of the engine 12 results in reduction of the electric energy stored in the storage device 36.

The electric energy consumption by the electric motor 14 in the event of a failure of the engine 12 or electric generator 52 can be further reduced with a result of an increase in the running distance of the vehicle, in the case where the speed ratio of the transmission 16 is controlled so as to reduce the electric energy consumption by the electric motor 14, by taking into account the power transfer efficiency $\eta_T$ of the transmission 16 and the energy conversion efficiency $\eta_M$ of the electric motor 14.

In the special drive control routine of FIG. 11, the vehicle is driven by the electric motor 14 even when the amount of electric energy SOC stored in the storage device 36 is smaller than the lower limit A. Namely, the entire amount of the electric energy stored in the storage device 36 can be used by the electric motor 14 even when the amount of the stored electric energy SOC is smaller than the lower limit A. This arrangement is effective to permit the vehicle to be run to the desired destination, by increasing the maximum running distance of the vehicle by the electric motor 14 in the event of a failure of the engine 12 or electric generator 52. Therefore, step R4 of FIG. 9 corresponds to lower limit changing means for reducing the lower limit of the electric energy stored in the storage device 36, above which the electric motor is permitted to operate.

While the presently preferred embodiments of this invention have been described above in detail by reference to the accompanying drawings, it is to be understood that the present invention is not limited to the details of the illustrated embodiment but may be otherwise embodied.

The transmission 16 used in the hybrid drive system 10, 50 in the illustrated embodiments incorporates the forward-reverse switching mechanism having the forward driving position and the reverse driving position. However, this switching mechanism is not essential. If this switching mechanism is eliminated, the vehicle can be run backward by operating the bidirectionally operable electric motor 14 in the reverse direction.

In the first embodiment, the clutch 30 is provided between the engine 12 and the transmission 16. Another clutch may be provided between the transmission 16 and the electric motor 14.

The present invention is equally applicable to a hybrid drive system of the type in which the outputs of the engine 12 and electric motor 14 are transmitted to the transmission 16 through a planetary gear device.

It is to be understood that the present invention may be embodied with various other changes, modifications and improvements, which may occur to those skilled in the art.

What is claimed is:

1. A hybrid drive system for a motor vehicle, comprising:

an engine operated as a first drive power source by combustion of a fuel;

an electric energy storage device which is charged with an electric energy by operation of said engine;

an electric motor operated as a second drive power source by the electric energy stored in said electric energy storage device; and a controller for selecting a low-load drive mode in which only said electric motor is operated to drive the vehicle, when a load as represented by a running condition of the vehicle and acting on the hybrid drive system is in a predetermined low-load range, and a high-load drive mode in which at least said engine is operated to drive the vehicle, when said load is in a predetermined high-load range in which said load acting on the hybrid drive system is higher than that in said predetermined low-load range, said running condition being represented by an amount of power currently required by an operator of the vehicle to drive the vehicle, and wherein said controller includes;

emergency drive control means operated in the event of a failure of one of said engine and said electric motor as said first and second drive power sources, for operating the other of said first and second drive power sources to drive said motor vehicle; and range changing means for changing one of said predetermined low-load and high-load ranges which corresponds to said other of said first and second drive power sources, when said other of said first and second drive power sources is operated by said emergency drive control means, said range changing means comprising upper limit changing means for narrowing said predetermined low-load range by reducing an upper limit of said low-load range, when said electric motor is operated as said other drive power source by said emergency drive control means in the event of a failure of said engine, so as to limit an output power produced by said electric motor to a value corresponding to the reduced upper limit of said low-load range, so that an amount of consumption of the electric energy by said electric motor is reduced to increase a distance of running of the motor vehicle by operation of said electric motor by the electric energy stored in said electric energy storage device.

2. A hybrid drive system for a motor vehicle, comprising:

an engine operated as a first drive power source by combustion of a fuel;

an electric energy storage device which is charged with an electric energy by operation of said engine;

an electric motor operated as a second drive power source by the electric energy stored in said electric energy storage device;

a transmission for transferring an output of one of said first and second drive power sources to a drive wheel of the vehicle, when one of said first and second drive power sources is selected depending upon a running condition of the vehicle; and a controller for controlling said transmission to change a speed ratio thereof depending upon said running condition, and wherein said controller comprises:

emergency drive control means operated in the event of a failure of one of said engine and said electric motor as said first and second drive power sources, for operating the other of said first and second drive power sources; and emergency shift control means for changing a predetermined relationship between said running condition of the vehicle and said speed ratio of said transmission, when said other of said first and second drive power sources is operated by said emergency drive control means.

3. A hybrid drive system according to claim 2, wherein said transmission has a plurality of operating positions having respective different speed ratio values, said controller controlling said transmission to be shifted to a selected one of said operating positions on the basis of an amount of operation of an accelerator pedal and a running speed of the vehicle, said predetermined relationship, being a relationship among said amount of operation of said accelerator pedal and said running speed of the vehicle and the operating position of the transmission to be selected by said controller.

4. A hybrid drive system for a motor vehicle, comprising:

an engine operated by combustion of a fuel;

an electric energy storage device which is charged with an electric energy by operation of said engine;

an electric motor operated by the electric energy stored in said electric energy storage device;

an electric motor operated by the electric energy stored in said electric energy storage device;

an automatic transmission whose speed ratio is variable; and a controller for operating at least said electric motor to drive the vehicle, said controller comprising energy-saving shift control means operated in response to a failure of said engine, for shifting said automatic transmission to change said speed ratio so as to reduce an amount of consumption of the electric energy by said electric motor by operating said automatic transmission and electric motor in an energy saving mode as a function of a running condition of the vehicle represented by an amount of power currently required by an operator of the vehicle to drive the vehicle, depending upon at least an energy conversion efficiency of said electric motor.

5. A hybrid drive system according to claim 4, wherein said energy-saving shift control means shifts said automatic transmission to change said speed ratio, depending upon a power transfer efficiency of said automatic transmission as well as said energy conversion efficiency of said electric motor.

6. A hybrid drive system for a motor vehicle, comprising:

an engine operated by combustion of a fuel;

an electric energy storage device which is charged with an electric energy by operation of said engine;

an electric motor operated by the electric energy stored in said electric energy storage device; and a controller for operating at least said electric motor to drive the vehicle when an amount of said electric energy stored in said electric energy storage device is greater than a predetermined lower limit and when said engine is functioning in a normal manner for hybrid operation of the motor vehicle, said controller comprising lower limit reducing means for reducing said predetermined lower limit of the electric energy stored in said electric energy storage device, energy which is stored in said electric energy storage device and to be available for consumption by the electric rotor in the event of said failure of said engine.

* * * * *